(12) United States Patent
Mori

(10) Patent No.: US 8,407,002 B2
(45) Date of Patent: Mar. 26, 2013

(54) INFORMATION PROVISION APPARATUS

(75) Inventor: Kenji Mori, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/541,289

(22) Filed: Jul. 3, 2012

(65) Prior Publication Data

US 2012/0271547 A1 Oct. 25, 2012

Related U.S. Application Data

(63) Continuation of application No. PCT/JP2010/062017, filed on Jul. 9, 2010.

(51) Int. Cl.
*G08G 1/123* (2006.01)

(52) U.S. Cl. .................................. 701/527; 340/988

(58) Field of Classification Search ............... 701/527; 340/988
See application file for complete search history.

(56) References Cited

U.S. PATENT DOCUMENTS

| | | | |
|---|---|---|---|
| 6,181,991 B1 * | 1/2001 | Kondo et al. ................. | 701/22 |
| 6,640,098 B1 | 10/2003 | Roundtree | |
| 2001/0047264 A1 | 11/2001 | Roundtree | |
| 2001/0049275 A1 | 12/2001 | Pierry et al. | |
| 2001/0049277 A1 | 12/2001 | Meyer et al. | |
| 2002/0002548 A1 | 1/2002 | Roundtree | |
| 2002/0002575 A1 | 1/2002 | Eisler et al. | |
| 2002/0002594 A1 | 1/2002 | Roundtree et al. | |
| 2002/0004736 A1 | 1/2002 | Roundtree et al. | |

FOREIGN PATENT DOCUMENTS

| | | |
|---|---|---|
| JP | A-11-313403 | 11/1999 |
| JP | A-2000-113261 | 4/2000 |
| JP | A-2000-113384 | 4/2000 |
| JP | A-2001-174277 | 6/2001 |
| JP | A-2001-297174 | 10/2001 |
| JP | A-2002-22476 | 1/2002 |
| JP | A-2003-21522 | 1/2003 |
| JP | A-2006-112932 | 4/2006 |
| JP | A-2009-48357 | 3/2009 |
| JP | A-2009-176295 | 8/2009 |
| JP | A-2009-528606 | 8/2009 |
| JP | A-2010-32459 | 2/2010 |
| WO | WO 2007/099234 A1 | 9/2007 |

OTHER PUBLICATIONS

International Search Report issued in International Patent Application No. PCT/JP2010/062017 dated Oct. 26, 2010.

* cited by examiner

*Primary Examiner* — Thomas Black
*Assistant Examiner* — Luke Huynh
(74) *Attorney, Agent, or Firm* — Oliff & Berridge, PLC

(57) ABSTRACT

A main computer includes an arrival determination section which determines, on the basis of present location information of a vehicle, destination information, and electric energy remaining amount information, whether the vehicle can reach the destination from the present location without charging an electricity storage unit of the vehicle, a rental car information acquisition section which acquires information regarding a rental car which the driver can change from the vehicle directly, and an information provision section which provides the rental car information to the driver of the vehicle, when the arrival determination section determines that the vehicle cannot reach the destination from the present location. On the basis of the rental car information, the driver of the vehicle can go to a rental car shop and rent a car. By changing from the vehicle to the rental car, the driver can quickly reach the destination by use of the rental car.

14 Claims, 15 Drawing Sheets

INFORMATION PROVISION APPARATUS

This is a Continuation of Application No. PCT/JP2010/062017 filed Jul. 9, 2010. The disclosure of the prior application is hereby incorporated by reference herein in its entirety.

TECHNICAL FIELD

The present invention relates to an information provision apparatus which provides information for reaching a destination to a driver of a vehicle on which a chargeable electricity storage unit is mounted.

BACKGROUND ART

Use of electric vehicles (EVs) and hybrid vehicles (HVs) has started to spread. Such a vehicle driven by electric energy includes an electricity storage unit such as a battery, and a drive source such as an electric motor. The drive source operates upon supply of electric energy from the electricity storage unit. As a result of operation of the drive source, the vehicle operates.

The vehicle driven by electric energy operates as a result of supply of electric energy from the electricity storage unit to the drive source. Therefore, if the remaining amount of electric energy stored in the electricity storage unit decreases, the electricity storage unit must be charged in order to continue the operation of the vehicle.

JP 2003-21522 A discloses an information provision apparatus which provides information regarding a route, over which an electric vehicle can travel, in accordance with the remaining amount of electric energy stored in an electricity storage unit mounted on the electric vehicle. This information provision apparatus calculates a travel-continuable distance; i.e., a distance over which the electric vehicle can travel without charging the electricity storage unit, on the basis of the remaining amount of electric energy stored in the electricity storage unit mounted on the electric vehicle. Also, the information provision apparatus determines the necessity of charging the electricity storage unit on the basis of the travel-continuable distance and the distance of a route up to a destination (estimated travel distance). Moreover, the information provision apparatus displays, on an onboard display, a location representing a charging point at which the electricity storage unit can be charged and which is present in a region which the electric vehicle can reach without charging of the electricity storage unit. Accordingly, in the case where the electric vehicle cannot reach the destination unless the electricity storage unit is charged, the driver of the electric vehicle can charge the electricity storage unit at the charging point displayed on the onboard display.

DISCLOSURE OF THE INVENTION

Presently, an adoption rate for the vehicles driven by electric energy is low. Therefore, a sufficient number of charging points have not yet been provided. Accordingly, there is a possibility that no charging point is present in a region which the vehicle driven by electric energy can reach without charging of the electricity storage unit. Further, since charging time is extremely long, as compared with the time required to fill up gasoline or the like, time loss is large.

The present invention has been accomplished in order to solve the above-described problem, and its object is to provide an information provision apparatus which provides a driver of a vehicle driven by electric energy with more useful information for reaching a destination.

An information provision apparatus of the present invention is adapted to provide information for reaching a destination to a driver of a vehicle which includes a chargeable electricity storage unit and which is driven by using electric energy supplied from the electricity storage unit. The information provision apparatus comprises an arrival determination section which determines whether or not the vehicle can reach the destination from the present location in such a manner as to satisfy a predetermined condition, on the basis of present location information, which is information regarding a present location of the vehicle, destination information, which is information regarding the destination, and electric energy remaining amount information, which is information regarding a remaining amount of electric energy stored in the electricity storage unit; a rental car information acquisition section which acquires rental car information, which is information regarding a rental car to which the driver can change from the vehicle directly or indirectly; and an information provision section which provides the rental car information acquired by the rental car information acquisition section, when the arrival determination section determines that the vehicle cannot reach the destination from the present location.

The information provision apparatus may further comprise a present location information acquisition section which acquires the present location information; a destination information acquisition section which acquires the destination information; and an electric energy remaining amount information acquisition section which acquires the electric energy remaining amount information.

According to the information provision apparatus of the present invention, when the vehicle cannot reach the destination from the present location in such a manner as to satisfy the predetermined condition, information regarding a rental car (rental car information) to which the driver can change from the vehicle directly or indirectly is provided to the driver of the vehicle. Therefore, the driver of the vehicle can quickly reach the destination by use of a rental car by changing from the vehicle to the rental car on the basis of the provided rental car information. In this manner, the information provision apparatus of the present invention provides useful information, including use of a rental car.

The present location information may be any information for specifying the present location of the vehicle. For example, the present location information may be information representing the position of the vehicle on a map. Alternatively, the present location information may be the address or the like of the present location of the vehicle. Similarly, the destination information may be any information for specifying the destination. For example, the destination information may be information representing the position of the destination on the map, or the address, facility name, phone number, or the like of the destination.

The electric energy remaining amount information is information for specifying the remaining amount of electric energy stored in the electricity storage unit. The electric energy remaining amount information may be information representing the remaining amount of electric energy itself, or information representing the amount of electric energy consumed from a fully charged state.

The arrival determination section determines whether or not the vehicle can reach the destination in such a manner as to satisfy the predetermined condition on the basis of the present location information, the destination information, and the electric energy remaining amount information. For example, the arrival determination section determines whether or not the vehicle can reach the destination in such a manner as to satisfy a condition of not charging the electricity storage unit, on the basis of a distance of a travel route obtained from the present location information and the destination information (estimated travel distance), and a travel-continuable distance of the vehicle obtained from the electric energy remaining amount information.

In the present invention, the term "rental car" refers to all vehicles which are lent with payment. The term "rental car" also encompasses vehicles which are shared by members of a car sharing group.

Preferably, the rental car information is information for specifying the location of a rental car. In the case where a rental car shop owns the rental car, the rental car information may include information representing the location, address, and phone number of that rental car shop.

The rental car information is information regarding a rental car to which the driver can change from the vehicle directly or indirectly. The expression "the driver changes directly" means that the driver changes from the vehicle to a rental car without changing to another mode of transportation. The expression "the driver changes indirectly" means that the driver changes from the vehicle to a rental car via another mode of transportation.

The information provision section may provide the rental car information automatically when the arrival determination section determines that the vehicle cannot reach the destination from the present location. Alternatively, the information provision section may provide the rental car information in accordance with a request from the driver of the vehicle when the arrival determination section determines that the vehicle cannot reach the destination from the present location.

The predetermined condition may be a condition determined in consideration of convenience of the driver of the vehicle. The predetermined condition may be a condition of not charging the electricity storage unit. By virtue of this feature, the rental car information is provided when the vehicle cannot reach the destination unless the electricity storage unit is charged. As a result, the driver of the vehicle can receive the rental car information without fail when necessary.

In this case, the arrival determination section may include an estimated travel distance computation section which compute an estimated travel distance, which is the distance of a travel route from the present location to the destination, on the basis of the present location information and the destination information; and a travel-continuable distance computation section which computes a travel-continuable distance, which is a distance over which the vehicle can travel without charging the electricity storage unit, on the basis of the electric energy remaining amount information. In this case, preferably, the arrival determination section determines whether or not the vehicle can reach the destination without charging the electricity storage unit, on the basis of the estimated travel distance and the travel-continuable distance.

The predetermined condition may be a condition that a charging time of the electricity storage unit required for the vehicle to reach the destination from the present location is equal to or less than a previously set time. By virtue of this feature, when the charging time is equal to or shorter than the set time (including the case where the charging time is 0), the rental car information is not provided. Therefore, after charging the electricity storage unit for a short period of time, the driver of the vehicle can reach the destination by use of the vehicle, without renting a rental car. Therefore, generation of cost for renting a rental car can be prevented. Also, it is possible to prevent the rental car information from being provided when it is unnecessary. Meanwhile, when the charging time is longer than the set time, the rental car information is provided. Therefore, the driver of the vehicle can rent a car on the basis of the provided rental car information, and can reach the destination by use of that rental car. Accordingly, time loss which is produced as a result of charging the electricity storage unit can be reduced.

Alternately, the predetermined condition may be a condition that the number of times of charging required for the vehicle to reach the destination from the present location is equal to or less than a previously set number of times. By virtue of this feature, when the number of times of charging is equal to or less than the set number of times (including the case where the number of times of charging is 0), the rental car information is not provided. Therefore, by charging the electricity storage unit, the driver of the vehicle can reach the destination by use of the vehicle, without renting a rental car. Therefore, generation of cost for renting a rental car can be prevented. Meanwhile, when the number of times of charging exceeds the set number of times, the rental car information is provided. Therefore, the driver of the vehicle can rent a car on the basis of the provided rental car information, and can reach the destination by use of that rental car. Thus, it becomes possible to eliminate the great time loss produced as a result of frequent charging of the electricity storage unit and the labor for charging work.

Preferably, the rental car information acquisition section is configured to acquire information regarding a rental car which is present in a region which the vehicle can reach from the present position without charging the electricity storage unit. By virtue of this feature, when the arrival determination section determines that the vehicle cannot reach the destination from the present location, there is provided information regarding a rental car which is present in a region which the vehicle can reach without charging the electricity storage unit. Therefore, the provided rental car information enables the driver of the vehicle to travel to a location where the rental car is present by use of the vehicle. Thus, the driver of the vehicle can change from the vehicle directly to the rental car.

In the case where a rental car is not present in a region which the vehicle can reach from the present position without charging the electricity storage unit, the rental car information acquisition section may acquire information regarding a vehicle dispatch service which dispatches a rental car to a location within the region. Then, the information provision section may provide the information regarding the vehicle dispatch service acquired by the rental car information acquisition section, when the arrival determination section determines that the vehicle cannot reach the destination from the present location. By virtue of this feature, when a rental car is not present in a region which the vehicle can reach from the present position without charging the electricity storage unit, information regarding a service for dispatching a rental car to a location within the region is provided. Therefore, on the basis of the provided information regarding the vehicle dispatch service, the driver of the vehicle can travel to the dispatch location of the rental car by using the vehicle, and can rent a car at the dispatch location. Thus, by means of changing from the vehicle to the rental car, the driver can reach the destination by using the rental car.

The rental car information acquisition section may include a route searching section which searches a plurality of routes each of which extends from the present location to the destination and in each of which a rental car is used in at least a portion of the route, when the arrival determination section determines that the vehicle cannot reach the destination from the present location, a cost information acquisition section which acquires information regarding a cost required for reaching the destination in accordance with each of the plurality of routes searched by the route searching section, and a route extraction section which extracts a cost-oriented route, which is a route that is the lowest in cost, on the basis of the cost information acquired by the cost information acquisition section. Then, the information provision section may provide information regarding a cost required for reaching the destination in accordance with the cost-oriented route, when the arrival determination section determines that the vehicle cannot reach the destination from the present location.

By virtue of this feature, the driver of the vehicle can know, in advance, the cost required for reaching the destination while using a rental car in a portion of the route. Also, the driver of the vehicle can reach the destination at low cost in accordance with the provided cost-oriented route.

The cost information may be the sum of costs which generates to reach the destination. The cost information may include information regarding traveling cost, such as payment for a rental car, a toll required for traveling a toll road(s), and a fare required for using public transportation on the way to the destination.

Preferably, the rental car information acquisition section preferentially acquires information regarding a rental car which suits the preferences of the driver of the vehicle. In this case, information regarding a rental car which matches the preferences of the driver of the vehicle may be provided. Therefore, the driver of the vehicle can rent a desired rental car on the basis of the provided information, and can reach the destination by use of that car.

The preferences on vehicles include not only the vehicle model and the appearance of each vehicle, but also all other aspects. For example, such preferences on vehicles include those on good or bad of energy consumption, existence or non-existence of consideration of the environment, and the roominess of the passenger compartment. The driver may input the preferences on vehicles to the information provision apparatus, or the preferences on vehicles of the driver may be stored in the information provision apparatus in advance.

As can be understood from the above description, according to the present invention, there is provided an information provision apparatus for providing, to a driver of a vehicle driven by electric energy, highly useful information which is used for reaching a destination and in which use of a rental car is taken into consideration.

MODE FOR CARRYING OUT THE INVENTION

Embodiments of the present invention will now be described below.

Figure 1:
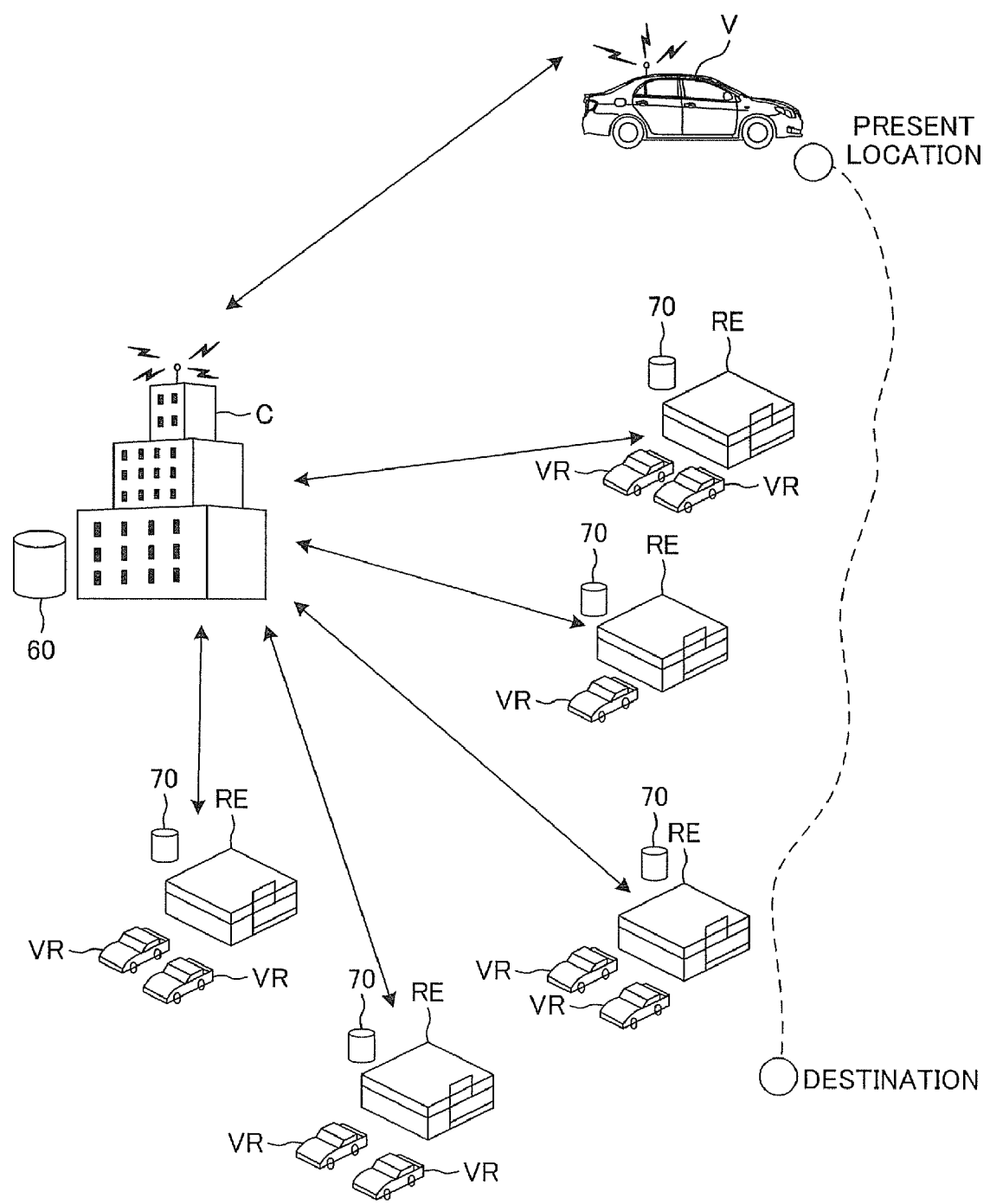
FIG. 1 is a diagram schematically showing an information communication system including an information provision apparatus according to an embodiment of the present invention.

FIG. 1 is a diagram schematically showing an information communication system including an information provision apparatus according to an embodiment of the present invention. This information communication system constitutes a communication network for connecting a vehicle V, a central management center C, and a plurality of rental car shops RE.

Figure 2:
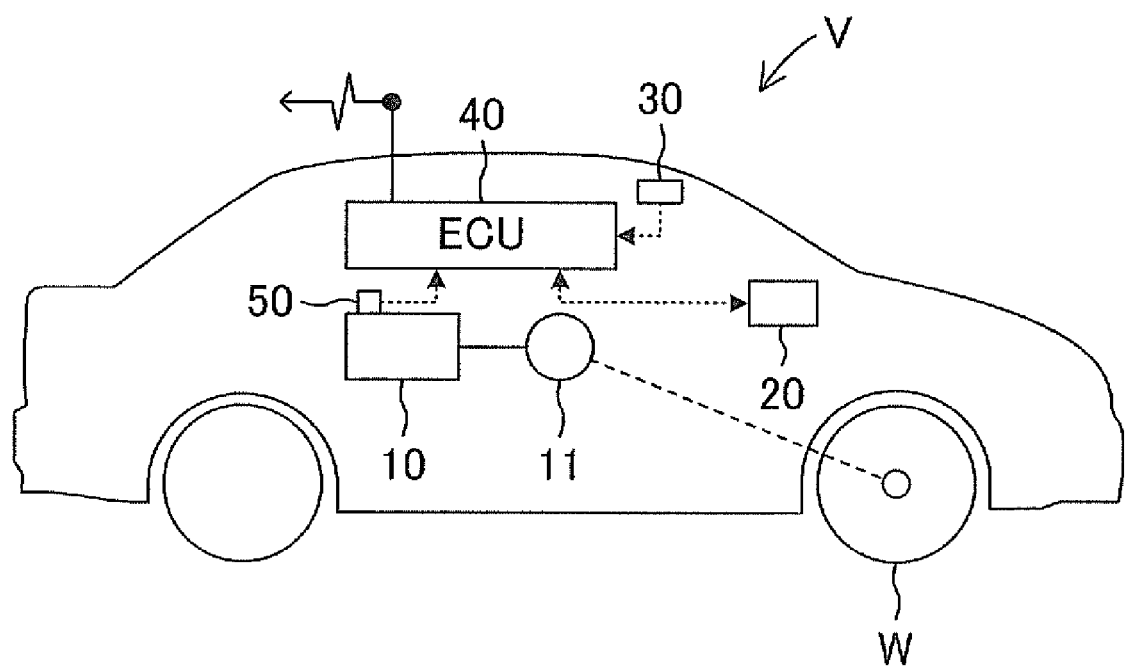
FIG. 2 is a diagram schematically showing the internal configuration of a vehicle driven by electric energy.

FIG. 2 is a diagram schematically showing the internal configuration of the vehicle V. As shown in FIG. 2, the vehicle V which is driven by using electric energy includes an electricity storage unit 10 and a motor 11. Electric energy is supplied from the electricity storage unit 10 to the motor 11. The motor 11 operates upon supply of electric energy. The vehicle V operates and travels as a result of transmission of drive force of the motor 11 to front wheels W. The vehicle V may be an electric vehicle (EV) or a hybrid vehicle (HV) (including PHV (plug-in HV)).

Further, the vehicle V includes a touch-panel-type display apparatus 20, a GPS unit 30, and an ECU 40. A destination, demands and instructions of a driver of the vehicle V are input to the display apparatus 20. The display apparatus 20 displays information received from the central management center C. The GPS unit 30 receives signals from GPS (Global Positioning System) satellites, and computes, on the basis of the received signals, present location information representing information for specifying the present location of the vehicle V. The ECU 40 controls the display 20. The ECU 40 receives the information from the display 20 and the present location information computed by the GPS unit 30. The ECU 40 sends these received pieces of information to the central management center C. Moreover, the ECU 40 receives signals from the central management center C, and displays on the display apparatus 20 information based on the received signals.

The vehicle V includes a remaining amount detection sensor 50 for detecting information regarding the remaining amount of electric energy stored in the electricity storage unit 10 (electric energy remaining amount information). The electric energy remaining amount information detected by this remaining amount detection sensor 50 is input to the ECU 40. The ECU 40 sends to the central management center C a signal representing the electric energy remaining amount information.

As shown in FIG. 1, the central management center C includes a main computer 60. The information sent to the central management center C is received to the main computer 60. On the basis of the received information, the main computer 60 sends to the vehicle V information useful for reaching a destination. The sent information is displayed on the display apparatus 20 via the ECU 40, and is provided to the driver of the vehicle V. The main computer 60 of the present embodiment corresponds to the information provision apparatus of the present invention.

Each rental car shop RE has one or a plurality of rental cars VR. Each rental car shop RE has a terminal computer 70. The terminal computer 70 includes a reservation database. The reservation database stores information regarding reservation of a rental car VR such as the model of a reserved car, rental start time, return time, etc. The main computer 60 is configured to be capable of accessing the reservation database. Therefore, the main computer 60 can check the status of reservations stored in the reservation database. The main computer 60 is configured to be able to write the details of a new reservation in a relevant reservation database.

Figure 3:
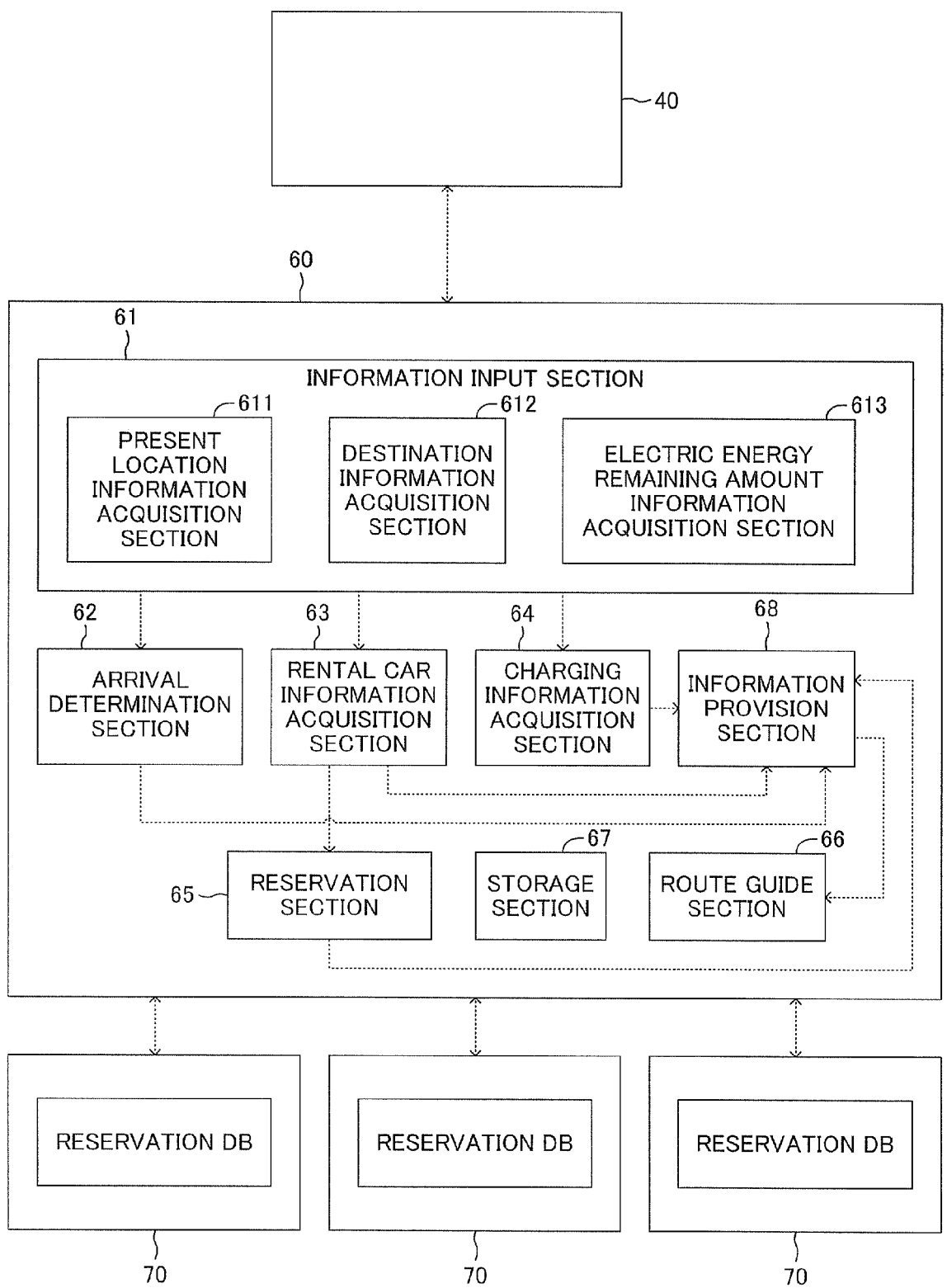
FIG. 3 is a diagram showing the connection relation among an ECU of the vehicle, a main computer of a central management center, and terminal computers of rental car shops.

FIG. 3 is a diagram showing the connection relation among the ECU 40 of the vehicle V, the main computer 60 of the central management center C, and terminal computers 70 of the rental car shops RE. As shown in this drawing, the ECU 40, the main computer 60, and the terminal computers 70 are interconnected via communications. The main computer 60 includes an information input section 61, an arrival determination section 62, a rental car information acquisition section 63, a charging information acquisition section 64, a reservation section 65, a route guide section 66, a storage section 67, and an information provision section 68.

The information input section 61 receives information input from the ECU 40. The information input section 61 includes a present location information acquisition section 611, a destination information acquisition section 612, and an electric energy remaining amount information acquisition section 613. The present location information acquisition section 611 acquires present location information from the ECU 40. The destination information acquisition section 612 acquires the destination information from the ECU 40. The electric energy remaining amount information acquisition section 613 acquires electric energy remaining amount information from the ECU 40. Notably, the destination information is information for specifying a destination which the driver of the vehicle V should reach. The destination information is acquired on the basis of the information input to the display apparatus 20 by the driver.

The arrival determination section 62 determines, on the basis of the present location information, the destination information, and the electric energy remaining amount information, whether or not the vehicle V can reach the destination in such a manner as to satisfy a predetermined condition.

The rental car information acquisition section 63 acquires information regarding a rental car to which the driver of the vehicle V can change directly or indirectly from the vehicle V (rental car information). In the present embodiment, the rental car information acquisition section 63 acquires information regarding a rental car which is present in a region to which the vehicle V can reach from the present location without charging the electricity storage unit 10. The rental car information is, for example, an information of a rental car shop which owns that rental car such as position, address, phone number of the rental car shop.

The charging information acquisition section 64 acquires information regarding a charging point(s) present within the region to which the vehicle V can reach from the present location without charging the electricity storage unit (charging information).

The reservation section 65 accesses the reservation database of a rental car shop when a rental car is to be rented, and executes processing for reserving a rental car, processing for reserving dispatch of a rental car, and processing for reserving charging of the electricity storage unit of the vehicle.

The route guide section 66 provides the driver of the vehicle V with guide information for guiding the vehicle V to travel along a searched route.

The storage section 67 stores pieces of information necessary for the arrival determination section 62, the rental car information acquisition section 63, the charging information acquisition section 64, the route guide section 66 to execute the respective processes. For example, the storage section 67 stores map information, charging information (the positions of charging points, charge fee, etc.), rental car information (the address, phone number, position of each rental car shop, rates of rental cars, availability of charging facilities, availability and details of vehicle dispatch service, etc.), the electric energy consumption ratio of the vehicle V, the storage capacity of the electricity storage unit 10, and a table which represents the relation between charging amount of the electricity storage unit 10 and charging time required for charging electric energy corresponding to the charging amount (charging amount–charging time table).

The information provision section 68 receives the result of determination by the arrival determination section 62, the rental car information acquired by the rental car information acquisition section 63, the charging information acquired by the charging information acquisition section 64, the status of the reservation made by the reservation section 65, and outputs these pieces of information so that these pieces of information are provided to the driver of the vehicle V.

In the above-described configuration, when the driver of the vehicle V travels to a destination, the main computer 60 of the central management center C provides information to a driver of the vehicle V as follows.

First, a user of the vehicle V gets into the vehicle V, and pushes a start button of the vehicle V. As a result, the vehicle V is activated. Also, the GPS unit 30 of the vehicle V computes present location information of the vehicle V, and outputs the computed present location information to the ECU 40. The ECU 40 sends the received present location information to the central management center C. The present location information acquisition section 611 of the main computer 60 acquires the present location information input from the ECU 40.

Further, the remaining amount detection sensor 50 of the vehicle V detects the remaining amount of electric energy stored in the electricity storage unit 10, and outputs to the ECU 40 information regarding the detected electric energy remaining amount. The ECU 40 sends the received electric energy remaining amount information to the central management center C. The electric energy remaining amount information acquisition section 613 of the main computer 60 acquires the electric energy remaining amount information input from the ECU 40.

Figure 4:
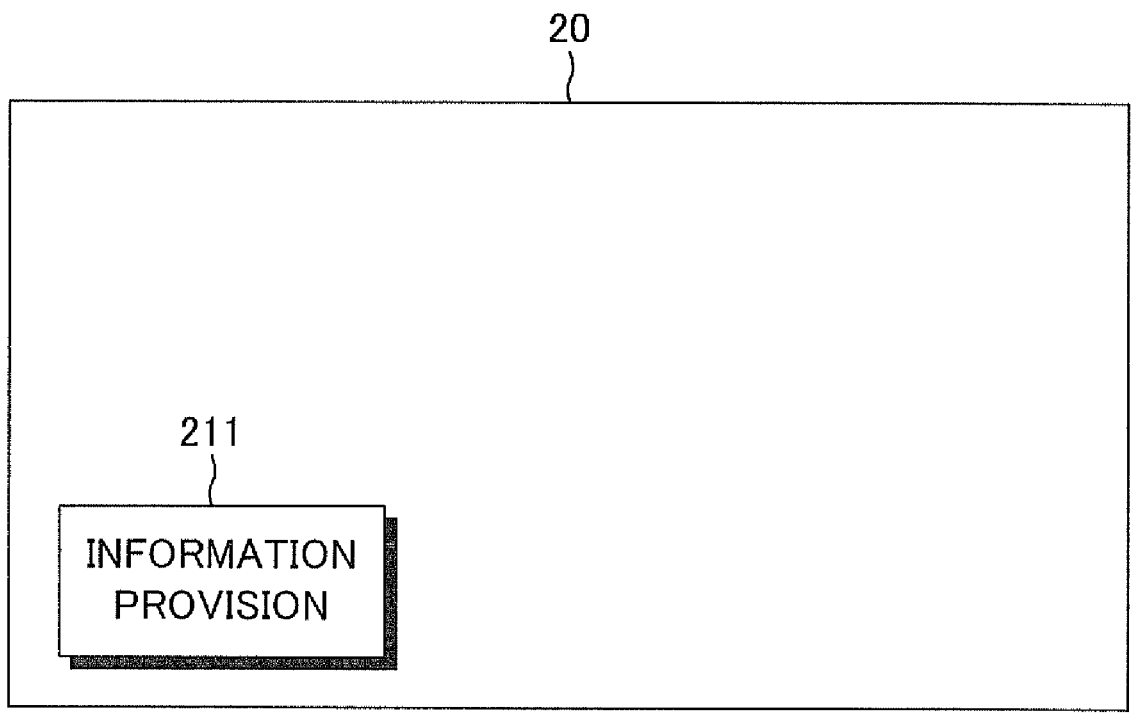
FIG. 4 is an illustration showing an example of the initial screen of a display.

Furthermore, the display apparatus 20 is activated, and displays an initial screen. FIG. 4 is an example of the initial screen. As can be understood from this drawing, an icon 211 for requesting provision of information is displayed on the display apparatus 20. When the driver of the vehicle V presses this icon 211, a screen for inputting a destination (destination input screen) is displayed on the display apparatus 20. The driver of the vehicle V inputs a destination through the destination input screen. Any inputting method may be used. For example, a map is displayed on the destination input screen, and a destination is selected from the map. Alternately, the address or facility name of the destination may be input through the destination input screen. The information regarding the inputted destination (destination information) is input to the ECU 40. The ECU 40 sends the received destination information to the central management center C. The destination information acquisition section 612 of the computer 60 acquires the sent destination information input from the ECU 40.

Figure 5:
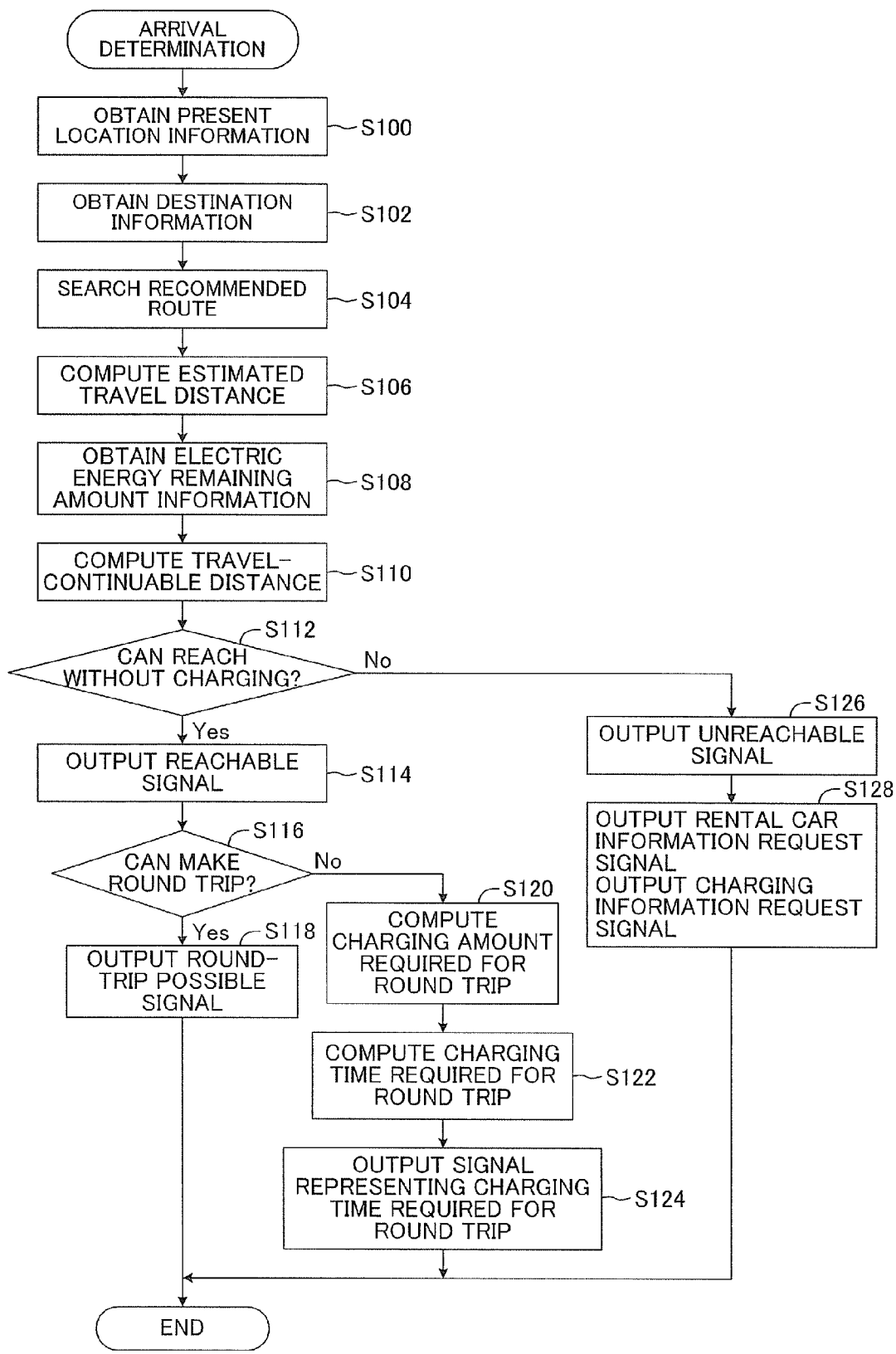
FIG. 5 is a flowchart showing arrival determination processing.

Upon acquisition of the destination information by the destination information acquisition section 612, the arrival determination section 62 of the main computer 60 performs processing for determining whether or not the vehicle V can reaches the destination from the present location while satisfying a predetermined condition (arrival determination processing). In the present embodiment, the predetermined condition is a condition of not charging the electricity storage unit 10. This condition may be set arbitrarily. FIG. 5 is a flowchart showing the arrival determination processing. According to this processing, first, in step (hereinafter "step" will be abbreviated to "S") 100, the arrival determination section 62 obtains the present location information from the present location information acquisition section 611. Next, the arrival determination section 62 obtains the destination information from the destination information acquisition section 612 (S102).

Subsequently, the arrival determination section 62 searches a recommended route from the present location to the destination on the basis of the present location information, the destination information, and the map information stored in the storage section 67 (S104).

Next, the arrival determination section 62 computes a travel distance of the vehicle V when the vehicle V travels along the recommended route from the present location to the destination (estimated travel distance) (S106). Subsequently, the arrival determination section 62 obtains the electric energy remaining amount information from the electric energy remaining amount information acquisition section 613 (S108). Next, the arrival determination section 62 computes, on the basis of the obtained electric energy remaining amount information, a distance over which the vehicle V can travel without charging the electricity storage unit 10 (travel-continuable distance) (S110). The travel-continuable distance is computed by multiplying the electric energy remaining amount (AH) and the electric energy consumption ratio (km/AH). The electric energy consumption ratio represents a distance over which the vehicle V can travel using a unit amount of electric energy. The arrival determination section 62 may obtain the electric energy consumption ratio input by the driver of the vehicle V via the display apparatus 20. Alternately, the arrival determination section 62 may obtain the electric energy consumption ratio as follows. An electric energy consumption ratio is calculated on the basis of the past operation history of the vehicle V, and the calculated electric energy consumption ratio is stored in the storage section 67. The arrival determination section 62 acquires the stored electric energy consumption ratio from the storage section 67.

Next, the arrival determination section 62 determines, through comparison between the travel-continuable distance and the estimated travel distance, whether or not the vehicle V can reach the destination from the present location while satisfying the condition of not charging the electricity storage unit 10 (S112). Specifically, in the case where the travel-continuable distance is greater than the estimated travel distance, the arrival determination section 62 determines that the vehicle V can reach the destination without charging the electricity storage unit 10; and, in the case where the travel-continuable distance is equal to or less than the estimated travel distance, the arrival determination section 62 determines that the vehicle V cannot reach the destination without charging the electricity storage unit 10.

When the arrival determination section 62 determines that the vehicle V can reach the destination without charging the electricity storage unit 10 (S112: Yes), the arrival determination section 62 outputs a reachable signal to the information provision section 68 (S114). The information provision section 68 sends the received reachable signal to the ECU 40 of the vehicle V. On the basis: of the received reachable signal, the ECU 40 displays, on the display apparatus 20 of the vehicle V, a message indicating that the vehicle V can reach the destination without charging the electricity storage unit 10 (reachable message). Thus, the driver is provided with information indicating that he or she can reach the destination by using the vehicle V, without charging the electricity storage unit 10.

After that, the arrival determination section 62 proceeds to S116, and determines, through comparison between the travel-continuable distance and a distance double the estimated travel distance (round-trip distance), whether or not the vehicle V can make a round trip between the present location and the destination without charging the electricity storage unit 10. Specifically, in the case where the travel-continuable distance is greater than the round-trip distance, the arrival determination section 62 determines that the vehicle V can make a round trip between the present location and the destination; and, in the case where the travel-continuable distance is equal to or less than the round-trip distance, the arrival determination section 62 determines that the vehicle V cannot make a round trip between the present location and the destination.

In the case where the arrival determination section 62 determines in S116 that the vehicle V can make a round trip (S116: Yes), the arrival determination section 62 outputs a round-trip possible signal to the information provision section 68 (S118). The information provision section 68 sends the received round-trip possible signal to the ECU 40 of the vehicle V. On the basis of the received round-trip possible signal, the ECU 40 displays, on the display apparatus 20 of the vehicle V, a message indicating that the vehicle V can make a round trip without charging the electricity storage unit 10. Thus, the driver is provided with information indicating that, unless the driver stops on the way, the driver can make a round trip between the present location and the destination by using the vehicle V, without charging the electricity storage unit 10. After that, the arrival determination section 62 ends this processing.

Meanwhile, in the case where the arrival determination section 62 determines in S116 that the vehicle V cannot make a round trip (S116: No), the arrival determination section 62 proceeds to S120, and computes a charging amount of the electricity storage unit 10 required for the round trip. The charging amount required for the round trip can be obtained by dividing the difference between the round-trip distance and the travel-continuable distance by the electric energy consumption ratio.

Next, the arrival determination section 62 computes a charging time required for the round trip with reference to the charging amount–charging time table stored in the storage section 67 (S122), and outputs to the information provision section 68 a signal representing the computed charging time (S124). The information provision section 68 sends the received signal to the ECU 40 of the vehicle V. On the basis of the received signal, the ECU 40 displays the charging time on the display apparatus 20 of the vehicle V. For example, when the charging time required for the round trip is 10 minutes, the ECU 40 displays on the display apparatus 20 a message indicating that "Charging of 10 min. enables you to make a round trip." Thus, the driver of the vehicle V is provided with information indicating that he or she cannot return to the present location unless the electricity storage unit 10 is charged on the return trip. After that, the arrival determination section 62 ends this processing.

In the case where the message indicating that a round trip can be made without charging the electricity storage unit 10 is displayed on the display apparatus 20 or the case where the charging time required for the round trip is displayed on the display apparatus 20, an icon for requesting a route guide for traveling to the destination may be displayed on the display apparatus 20 along with these messages. By pressing this icon, the route guide section 66 of the main computer 60 executes route guide processing. Since this route guide processing is well known, its detailed description is omitted. Briefly speaking, first, a recommended route is displayed on the display apparatus 20 of the vehicle V together with map information. Then, the heading direction of the vehicle V is instructed by means of, for example, sound guide, such that the vehicle V reaches the destination along the recommended route.

When the arrival determination section 62 determines in S112 that the vehicle V cannot reach the destination without charging the electricity storage unit 10 (S112: No), the arrival determination section 62 proceeds to S126, and outputs an unreachable signal to the information provision section 68. The information provision section 68 sends the received unreachable signal to the ECU 40 of the vehicle V. On the basis of the received unreachable signal, the ECU 40 displays, on the display apparatus 20 of the vehicle V, a message indicating that the vehicle V cannot reach the destination unless the electricity storage unit 10 is charged (unreachable message). Thus, the driver of the vehicle V is provided with information indicating that he or she cannot reach the destination by using the vehicle V unless the electricity storage unit 10 is charged.

Figure 6:
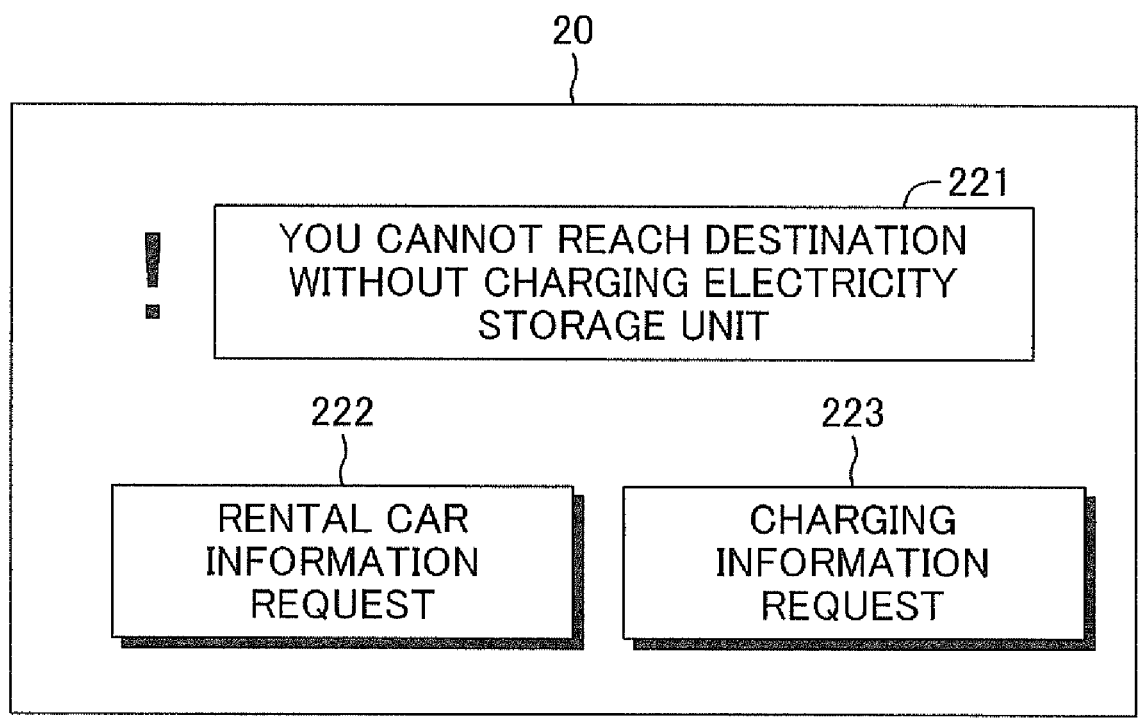
FIG. 6 is an illustration showing the display which displays a message indicating that the vehicle cannot reach a destination.

Next, the arrival determination section 62 outputs a rental car information request signal and a charging information request signal to the information provision section 68. The information provision section 68 sends these signals to the ECU 40. On the basis of the received signals, the ECU 40 displays, on the display apparatus 20, an icon for requesting information regarding a rental car (rental car information) and an icon for requesting information regarding charging (charging information). FIG. 6 shows the display apparatus 20, on which these icons are displayed. As shown in FIG. 6, an icon 222 for requesting the rental car information and an icon 223 for requesting the charging information are displayed on the display apparatus 20 along with an unreachable message 221.

Figure 7:
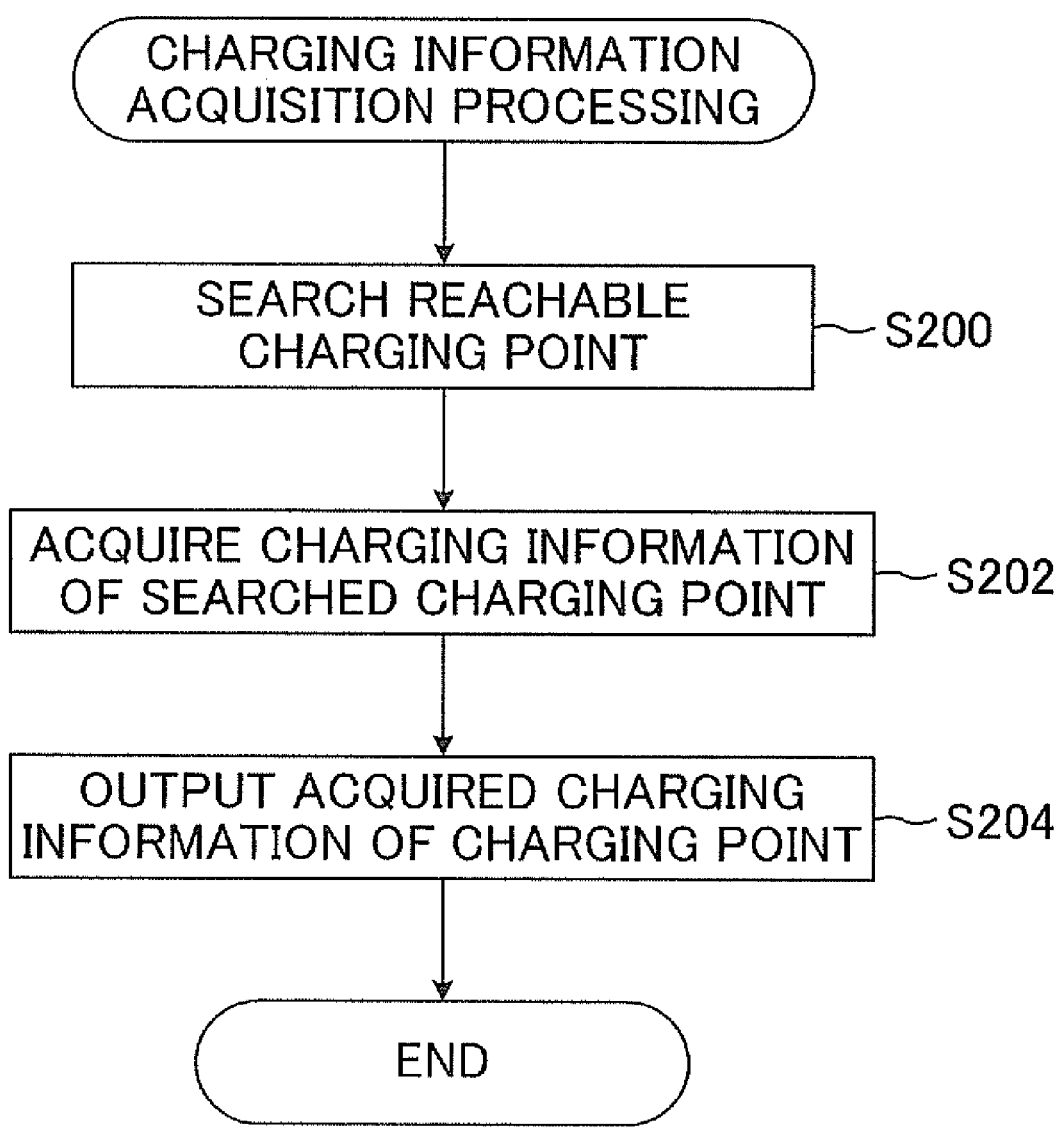
FIG. 7 is a flowchart showing charging information acquisition processing.

When the icon 223 for requesting the charging information is pressed by the driver of the vehicle V, a request signal of charging information is sent from the ECU 40 to the central management center C. The request signal of charging information is received to the charging information acquisition section 64 of the main computer 60. Upon receipt of the request signal of charging information, the charging information acquisition section 64 executes charging information acquisition processing. FIG. 7 is a flowchart showing the charging information acquisition processing. According to this processing, first, at S200 of FIG. 7, the charging information acquisition section 64 searches, on the basis of the present location information of the vehicle V and information representing the positions of charging points stored in the storage section 67, a charging point present in a region which the vehicle V can reach without charging the electricity storage unit 10. Next, the charging information acquisition section 64 acquires the charging information (the position of the charging point, charging fee, etc.) of the searched charging point from the storage section 67 (S202). Next, the charging information acquisition section 64 outputs the acquired charging information of the charging point to the information provision section 68. The information provision section 68 sends the received charging information to the ECU 40. The ECU 40 displays the received charging information on the display apparatus 20. As a result, the charging information is provided to the driver of the vehicle V. After that, the charging information acquisition section 64 ends this routine. On the basis of the displayed charging information, the driver of the vehicle V can travel to the charging point, and can charge the electricity storage unit 10 there.

In the case where the charging information is displayed on the display apparatus 20, an icon for requesting a route guide for traveling to the charging point indicated by the charging information may be displayed on the display apparatus 20. When this icon is pressed, the destination is set to that charging point. Notably, in the case where a plurality of pieces of charging information are displayed on the display apparatus 20, the destination is set to a charging point indicated by a piece of charging information selected by the driver. Then, the route guide section 66 executes the route guide processing. The route guide section 66 searches a recommended route for traveling to that charging point on the basis of the present location information and the destination information (the position information of that charging point). The route guide section 66 then starts the route guide such that the vehicle V travels along the recommended route. This route guide enables the driver of the vehicle V to quickly reach the charging point.

Figure 8:
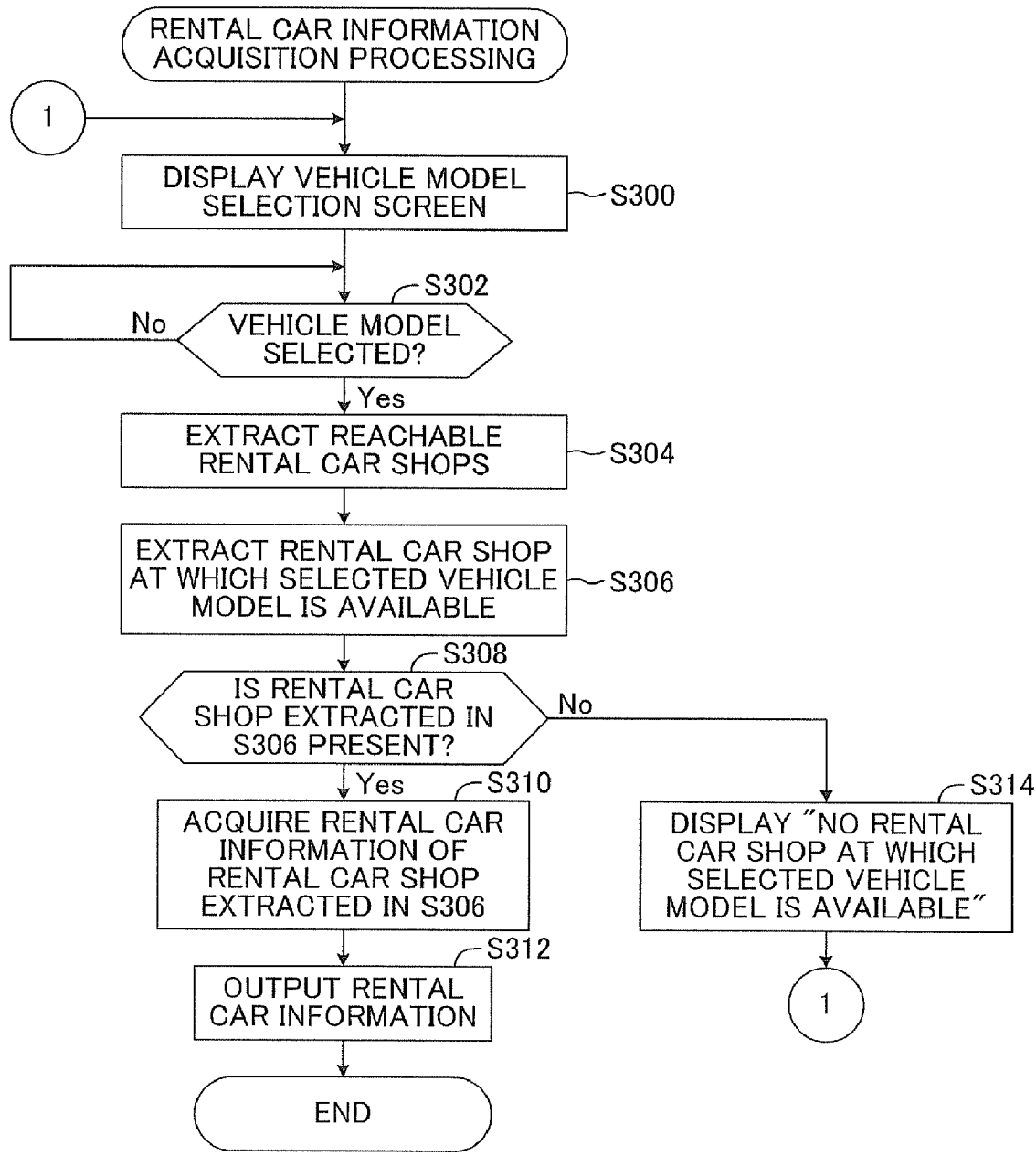
FIG. 8 is a flowchart showing rental car information acquisition processing.

Meanwhile, when the icon 222 for requesting the rental car information, which is displayed on the display apparatus 20 shown in FIG. 6, is pressed by the driver of the vehicle V, a request signal of rental car information is sent from the ECU 40 to the central management center C. The request signal of rental car information is received to the rental car information acquisition section 63 of the main computer 60. Upon receipt of the rental car information request signal, the rental car information acquisition section 63 executes rental car information acquisition processing. FIG. 8 is a flowchart showing the rental car information acquisition processing. According to this processing, first, at S300 of FIG. 8, the rental car information acquisition section 63 causes the display apparatus 20 to display a vehicle model selection screen. The driver of the vehicle V selects, from the list of vehicle models displayed on the vehicle model selection screen, a vehicle model which suits the driver's preferences.

In the case where one vehicle model which suits the driver's preferences is selected by the driver (S302: Yes), the rental car information acquisition section 63 extracts, among the rental car shops stored in the storage section 67, rental car shops which are present in a region which the vehicle V can reach from the present location without charging the electricity storage unit 10 (S304). Specifically, on the basis of the present location information and the position information of each rental car shop stored in the storage section 67, the rental car information acquisition section 63 computes a travel distance necessary for reaching to each rental car shop from the present location. The rental car information acquisition section 63 extracts, through comparison between the computed travel distances and the travel-continuable distance, rental car shops present in a region which the vehicle V can reach from the present location without charging the electricity storage unit 10.

Subsequently, the rental car information acquisition section 63 extracts, from the rental car shops extracted in S304, a rental car shop where the selected vehicle model is available (S306). Specifically, the rental car information acquisition section 63 extracts, from the rental car shops extracted in the S304, rental car shops which own the selected vehicle model. Furthermore, the rental car information acquisition section 63 accesses the reservation database of the extracted rental car shops, and checks whether or not the selected vehicle model is available by checking whether or not the selected vehicle model has already been reserved by another person. Thus, the rental car information acquisition section 63 extracts a rental car shop for which it has been confirmed that the selected vehicle model is available.

Subsequently, the rental car information acquisition section 63 determines whether or not the rental car shop extracted in S306 is present (S308). In the case where the extracted rental car shop is not present (S308: No), the rental car information acquisition section 63 proceeds to S314, and displays on the display apparatus 20 a message indicating that a rental car shop at which the selected vehicle model is available is not present. After that, the rental car information acquisition section 63 returns to S300 so as to again display the vehicle model selection screen on the display apparatus 20. The driver of the vehicle V again selects one vehicle model from the list of vehicle models displayed on the display apparatus 20.

Meanwhile, in the case where the extracted rental car shop is present (S308: Yes), the rental car information acquisition section 63 proceeds to S310, and acquires the rental car information of the rental car shop extracted in S306, on the basis of the rental car information stored in the storage section 67. Thus, there is acquired information regarding a rental car to which the driver can change from the vehicle V. Then, the rental car information acquisition section 63 outputs the acquired rental car information to the information provision section 68 (S312).

The information provision section 68 sends the received rental car information to the ECU 40. The ECU 40 displays the received rental car information on the display apparatus 20. The rental car information displayed on the display apparatus 20 may include the address and phone number of the rental car shop, its location on the map, the rate of the rental car, etc. Notably, in the case where a plurality of rental car shops have been extracted in S306, the rental car information acquisition section 63 may further extract, from the extracted rental car shops, a rental car shop closest to the recommended route, acquire the rental car information of that rental car shop, and display the acquired rental car information on the display apparatus 20. In this manner, the information provision section 68 provides to the driver of the vehicle V the information regarding a rental car to which the driver can change from the vehicle V. The driver of the vehicle V determines whether to rent a car at the displayed rental car shop by checking the rental car information displayed on the display apparatus 20. After that, the rental car information acquisition section 63 ends this routine.

In the case where the rental car information is displayed on the display apparatus 20, an icon for requesting a reservation may be displayed on the display apparatus 20 along with the rental car information. When this icon is pressed, a rental car reservation signal is sent to the central management center C. The reservation signal is received to the reservation section 65 of the main computer 60. Upon receipt of the rental car reservation signal, the reservation section 65 executes reservation processing.

Figure 9:
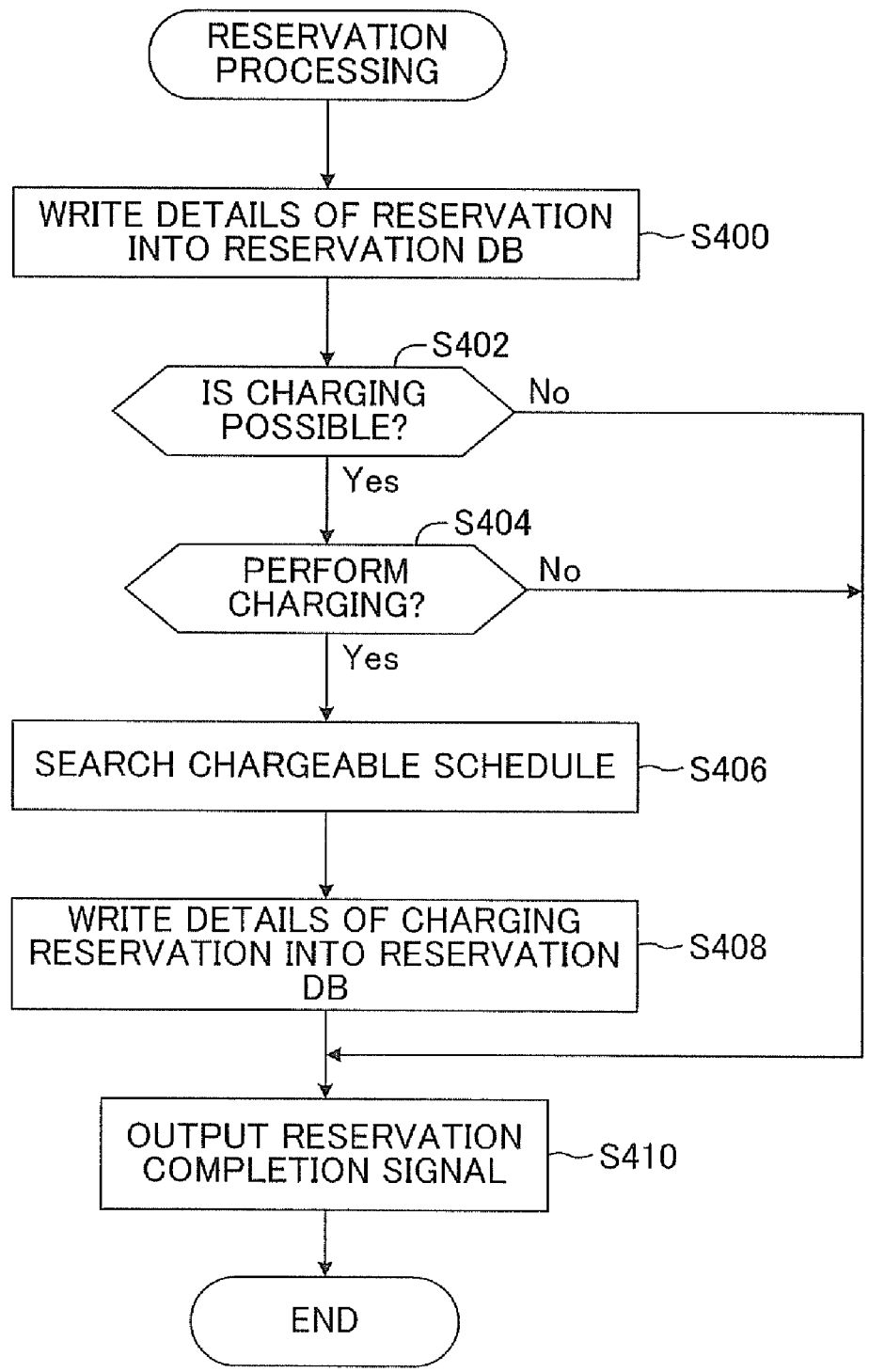
FIG. 9 is a flowchart showing reservation processing.

FIG. 9 is a flowchart showing the reservation processing. According to this processing, the reservation section 65 first accesses the reservation database of a rental car shop which has a vehicle to be reserved, and writes the details of the reservation in the reservation database (S400). The details of the reservation may include, for example, the vehicle model of the rental car, a rental start time, a return time, and a return location. The reservation processing is completed by writing the details of the reservation in the reservation database.

Next, the reservation section 65 determines whether or not the electricity storage unit 10 can be charged at the rental car shop at which a rental car is reserved, on the basis of information regarding availability of charging facility of the rental car shop stored in the storage section 67 (S402). In the case where the electricity storage unit 10 cannot be charged at that rental car shop (S402: No), the reservation section 65 proceeds to S410. Meanwhile, in the case where the electricity storage unit 10 can be charged at that rental car shop (S402: Yes), the reservation section 65 proceeds to S404, and displays, on the display apparatus 20, an icon for requesting charging and an icon for requesting not charging. When the icon for requesting not charging is pressed (S404: No), the reservation section 65 proceeds to S410. Meanwhile, when the icon for requesting charging is pressed (S404: Yes), the reservation section 65 proceeds to S406, and accesses the reservation database of that rental car shop so as to search the charging schedule (S406). The reservation section 65 then determines a time at which charging is possible, and writes the details of a reservation for charging in the reservation database (S408). Thus, the reservation for charging is completed. After that, the reservation section 65 proceeds to S410.

In S410, the reservation section 65 outputs a reservation completion signal to the information provision section 68. The information provision section 68 sends the received reservation completion signal to the ECU 40. On the basis of the received reservation completion signal, the ECU 40 displays, on the display apparatus 20 of the vehicle V, a message indicating that the reservation is completed. In this case, when charging at that rental car shop is not reserved, a message indicating that the reservation for the rental car is completed is displayed on the display apparatus 20. Meanwhile, when charging at that rental car shop is reserved, a message indicating the completion of the reservation for the rental car and the completion of the reservation for charging the electricity storage unit 10 is displayed on the display apparatus 20. After that, the reservation section 65 ends this routine.

The above-described reservation processing enables the driver of the vehicle V to quickly rent a car after arrival at the rental car shop. Further, in the case where charging of the electricity storage unit 10 is reserved, the electricity storage unit 10 of the vehicle V is charged in a period in which the driver uses the rental car. Therefore, after returning the rental car, the driver can quickly move to another location without charging the electricity storage unit 10 by himself or herself.

During the rental car information is displayed on the display apparatus 20 or a message indicating the completion of the reservation is displayed on the display apparatus 20, an icon for requesting a route guide for traveling to that rental car shop may be displayed on the display apparatus 20 along with the rental car information and the message indicating the completion of the reservation. When this icon is pressed, the destination is set to that rental car shop. Then, the route guide section 66 executes the route guide processing. As a result, a recommended route for traveling to that rental car shop is searched on the basis of the present location information and the destination information (the position information of that rental car shop). Then, route guide is started in accordance with the recommended route. This route guide enables the driver of the vehicle V to quickly reach the rental car shop by driving the vehicle V.

As described above, the main computer 60 (information provision apparatus) of the present embodiment comprises the arrival determination section 62, which determines, on the basis of the present location information of the vehicle V, the destination information, and the electric energy remaining amount information, whether or not the vehicle V can reach the destination from the present location while satisfying the condition of not charging the electricity storage unit 10 of the vehicle V, the rental car information acquisition section 63, which acquires information regarding a rental car to which the driver can change directly from the vehicle V (rental car information), and the information provision section 68, which provides the driver of the vehicle V with rental car information acquired by the rental car information acquisition section 63 when the arrival determination section 62 determines that the vehicle V cannot reach the destination from the present location.

Accordingly, in the case of a long-distance travel in which the driver cannot reach the destination by using the vehicle V, the rental car information is provided to the driver. The provided rental car information enables the driver of the vehicle V to go to a rental car shop, and rent a car. Thus, by means of changing from the vehicle V directly to the rental car, the driver can quickly reach the destination by using the rental car.

Further, the rental car information acquisition section 63 provides the rental car information regarding the vehicle model which suits the driver's preferences on vehicles. Therefore, the driver can rent a desired car on the basis of the provided information, and can reach the destination by using that car.

Figure 10:
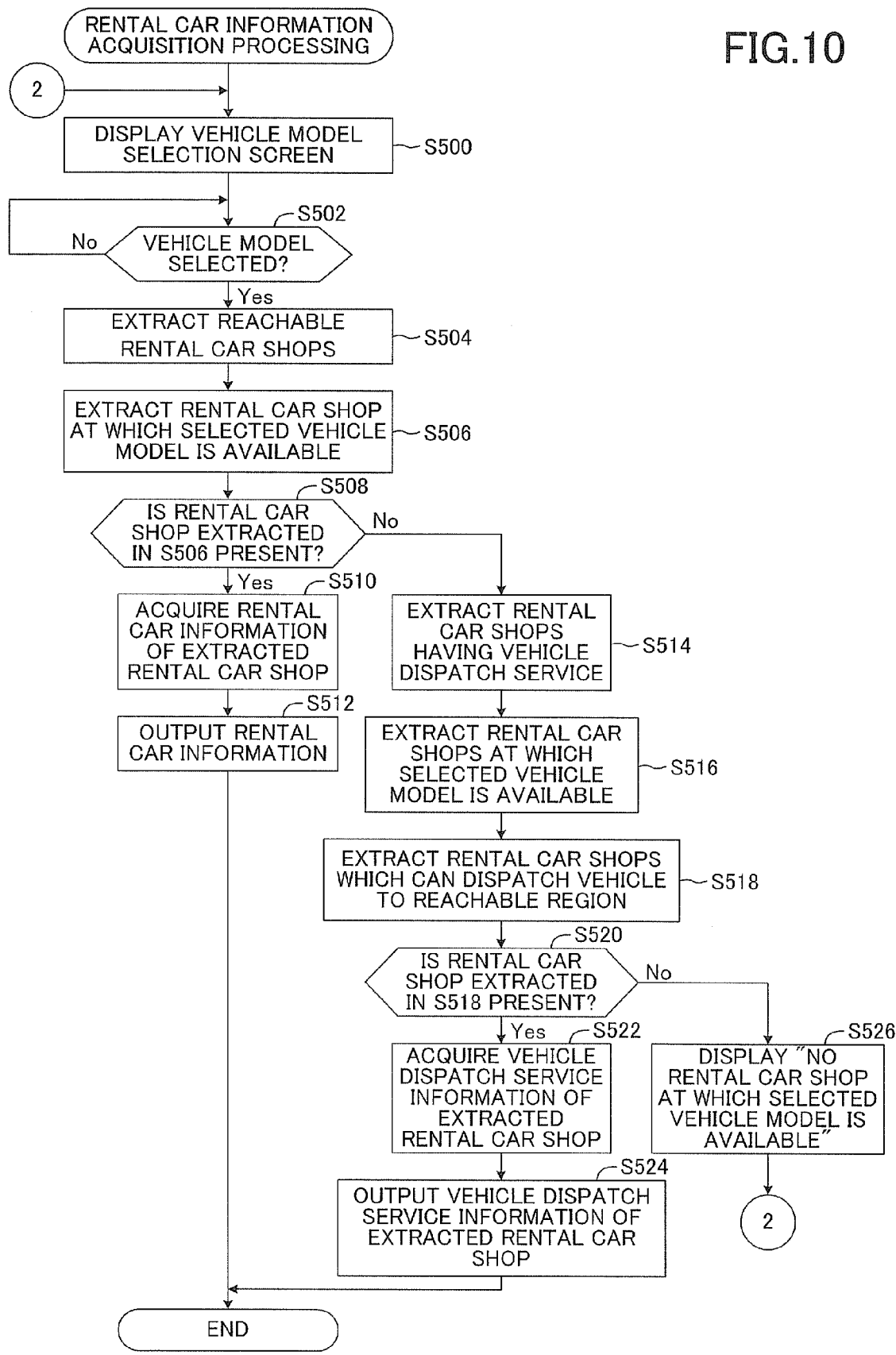
FIG. 10 is a flowchart showing rental car information acquisition processing different from that shown in FIG. 8.

The rental car information acquisition section 63 may execute rental car information acquisition processing represented by a flowchart shown in FIG. 10, in place of the rental car information acquisition processing shown in FIG. 8. According to this processing, when a rental car shop at which a selected vehicle model is available is not present in a region which the vehicle V can reach without charging the electricity storage unit 10, information regarding a service of dispatching the selected model is provided.

The rental car information acquisition processing shown in FIG. 10 is executed when the driver of the vehicle V presses the icon 222 for requesting the rental car information displayed on the display apparatus 20 shown in FIG. 6. When the icon 222 is pressed, the rental car information acquisition section 63 first causes the display apparatus 20 to display a vehicle model selection screen (S500). The driver of the vehicle V selects a vehicle model which suits the driver's preferences from the list of vehicle models displayed on the vehicle model selection screen. When a vehicle model is selected by the driver (S502: Yes), the rental car information acquisition section 63 extracts rental car shops which the vehicle V can reach without charging the electricity storage unit 10 (S504). Subsequently, the rental car information acquisition section 63 extracts, from the extracted rental car shops, a rental car shop where the selected vehicle model is available (S506). Subsequently, the rental car information acquisition section 63 determines whether or not the rental car shop extracted in S506 is present (S508).

In the case where the rental car shop extracted in S506 is present (S508: Yes), the rental car information acquisition section 63 acquires the rental car information of the extracted rental car shop (S510), and outputs the acquired rental car information to the information provision section 68 (S512).

The information provision section 68 sends the received rental car information to the ECU 40. The ECU 40 displays the received rental car information on the display apparatus 20. The driver of the vehicle V checks the rental car information displayed on the display apparatus 20, and determines whether to rent a car at the displayed rental car shop. After that, the rental car information acquisition section 63 ends this routine.

Meanwhile, in the case where the rental car shop extracted in S506 is not present (S508: No), the rental car information acquisition section 63 proceeds to S514, and extracts rental car shops which provide a vehicle dispatch service on the basis of the rental car information stored in the storage section 67. The vehicle dispatch service is a service of transporting a rental car to a designated location, and renting the rental car there.

Next, the rental car information acquisition section 63 extracts, from the rental car shops extracted in S514, rental car shops at which the selected vehicle model is available (S516). Specifically, the rental car information acquisition section 63 extracts, from the rental car shops extracted in S514, rental car shops which own the selected vehicle model. Furthermore, the rental car information acquisition section 63 accesses the reservation database of each of the extracted rental car shops, and checks whether or not the selected vehicle model has already been reserved by another person. The rental car information acquisition section 63 then extracts a rental car shop for which it has been confirmed that the selected vehicle model is available.

Next, on the basis of the information regarding the details of the vehicle dispatch service stored in the storage section 67, the rental car information acquisition section 63 extracts, from the rental car shops extracted in S516, a rental car shop which can dispatch a rental car to a location in a region which the vehicle V can reach without charging the electricity storage unit 10 (reachable region) (S518).

Subsequently, the rental car information acquisition section 63 determines whether or not the rental car shop extracted in S518 is present (S520). In the case where the extracted rental car shop is not present (S520: No), the rental car information acquisition section 63 proceeds to S526, and displays on the display apparatus 20 a message indicating that a rental car shop at which the selected vehicle model is available is not present. After that, the rental car information acquisition section 63 returns to S500 so as to again display the vehicle model selection screen on the display apparatus 20. The driver of the vehicle V again selects one vehicle model from the list of vehicle models displayed on the display apparatus 20.

Meanwhile, in the case where the extracted rental car shop is present (S520: Yes), the rental car information acquisition section 63 acquires the information regarding the vehicle dispatch service of the extracted rental car shop, on the basis of the rental car information stored in the storage section 67 (S522). Then, the rental car information acquisition section 63 outputs the acquired information regarding the vehicle dispatch service to the information provision section 68 (S524).

The information provision section 68 sends the received information regarding the vehicle dispatch service to the ECU 40. The ECU 40 displays the received information regarding the vehicle dispatch service on the display apparatus 20. For example, the information regarding the vehicle dispatch service displayed on the display apparatus 20 may include a location to which a rental car can be dispatched, the rate of the rental car, etc. Other pieces of rental car information may be displayed at the same time. In this manner, the information provision section 68 provides the information regarding the vehicle dispatch service to the driver of the vehicle V. The driver of the vehicle V checks the information regarding the vehicle dispatch service displayed on the display apparatus 20, and determines whether to use the vehicle dispatch service. After that, this processing ends.

During the information regarding the vehicle dispatch service is displayed on the display apparatus 20, an icon for reserving the vehicle dispatch service is also displayed on the display apparatus 20. By pressing this icon, a vehicle-dispatch reservation signal is sent to the central management center C. The vehicle-dispatch reservation signal is received to the reservation section 65 of the main computer 60. Upon receipt of the vehicle-dispatch reservation signal, the reservation section 65 executes vehicle-dispatch reservation processing.

Figure 11:
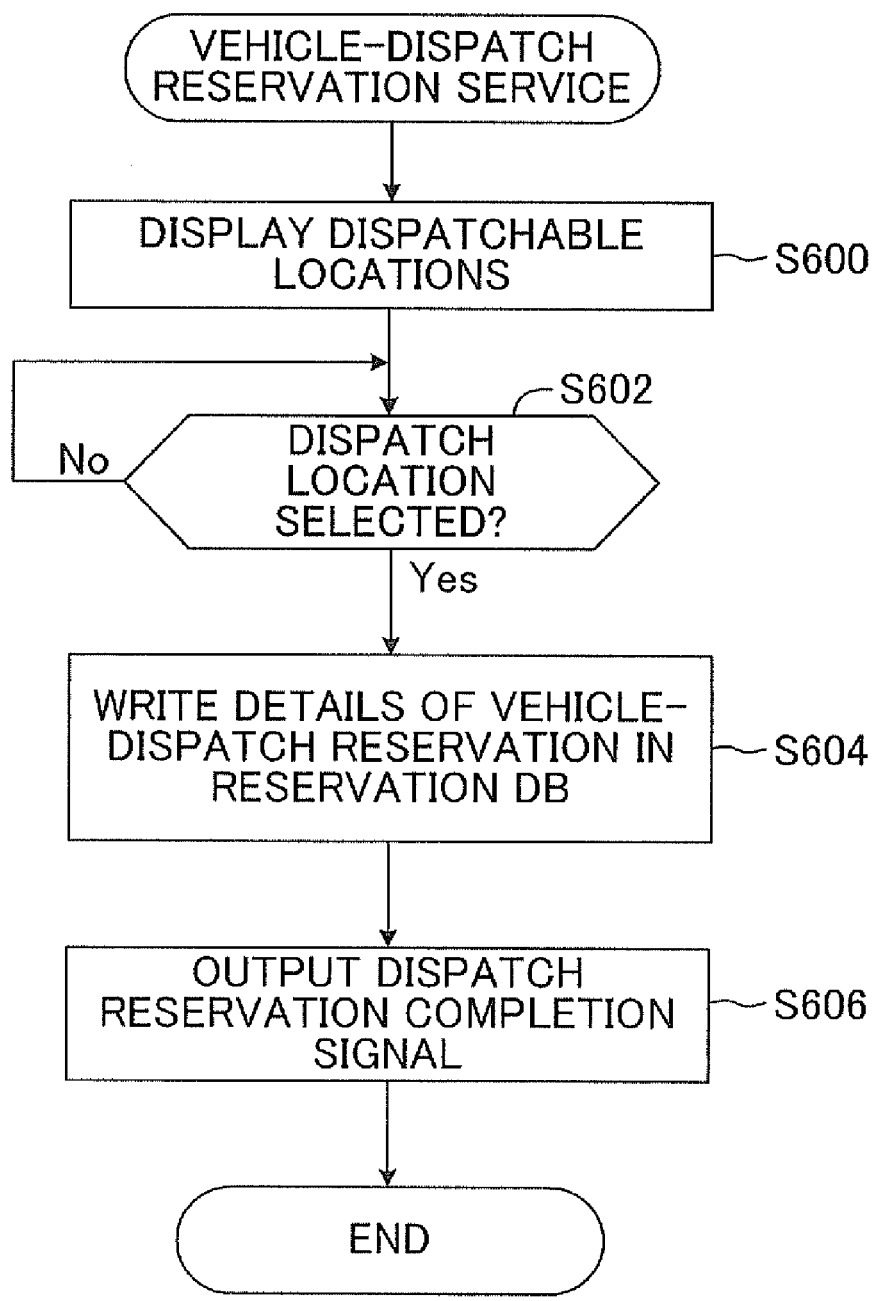
FIG. 11 is a flowchart showing vehicle-dispatch reservation processing.

FIG. 11 is a flowchart showing the vehicle-dispatch reservation processing. According to this processing, the reservation section 65 first displays dispatchable locations on the display apparatus 20 of the vehicle V. Dispatchable locations represent locations to which the rental car of the rental car shop at which the vehicle dispatch is reserved can be dispatched within a region which the vehicle V can reach without charging the electricity storage unit 10 (dispatchable locations) (S600). The dispatchable locations may be affiliated shops of the rental car shop at which the vehicle dispatch is reserved. The driver of the vehicle V selects one of the dispatchable locations displayed on the display apparatus 20. When a dispatchable location is selected (S602: Yes), the reservation section 65 accesses the reservation database of the rental car shop at which the vehicle dispatch is reserved, and writes the details of the vehicle-dispatch reservation in the reservation database (S604). The details of the reservation may include, for example, a dispatch location, a rental start time, a return time, and a return location. Thus, the processing for reserving dispatch of a rental car is completed. Notably, after the completion of the vehicle-dispatch reservation, the reservation section 65 may execute processing for reserving the charging of the electricity storage unit 10.

After the completion of the vehicle-dispatch reservation processing, the reservation section 65 outputs a dispatch reservation completion signal to the information provision section 68 (S606). The information provision section 68 sends the received dispatch reservation completion signal to the ECU 40. On the basis of the received dispatch reservation completion signal, the ECU 40 displays, on the display apparatus 20 of the vehicle V, a message indicating that the dispatch reservation is completed. By reading the message displayed on the display apparatus 20, the driver of the vehicle V confirms that the dispatch reservation is completed. After that, this processing is ended. The above-described vehicle-dispatch reservation processing enables the driver of the vehicle V to quickly rent a car after arrival at the dispatch location.

When a message indicating the completion of the vehicle-dispatch reservation is displayed on the display apparatus 20, an icon for requesting a route guide for traveling to the dispatch location may be displayed on the display apparatus 20 along with the above-mentioned message. When this icon is pressed, the destination is set to the dispatch location. Then, the route guide section 66 executes the route guide processing. As a result, a recommended route for traveling to the dispatch location is searched on the basis of the present location information and the destination information (the position information of the dispatch location). Then, route guide is started in accordance with the recommended route. This route guide enables the driver of the vehicle V to quickly reach the dispatch location by driving the vehicle V.

As described above, in the case where the rental car information acquisition section 63 executes the rental car information acquisition processing shown in FIG. 10, the rental car information acquisition section 63 acquires the information regarding the vehicle dispatch service, which dispatches a rental car to the reachable region which the vehicle V can reach from the present location without charging the electricity storage unit 10, when a rental car is not present in a reachable region. Then, the information provision section 68 provides the information regarding the vehicle dispatch service. Accordingly, on the basis of the provided information regarding the vehicle dispatch service, the driver of the vehicle V can travel to the dispatch location of the rental car by using the vehicle V, and can rent the car at the dispatch location. Thus, by means of changing from the vehicle V directly to the rental car, the driver can quickly reach the destination by using the rental car.

Figure 12:
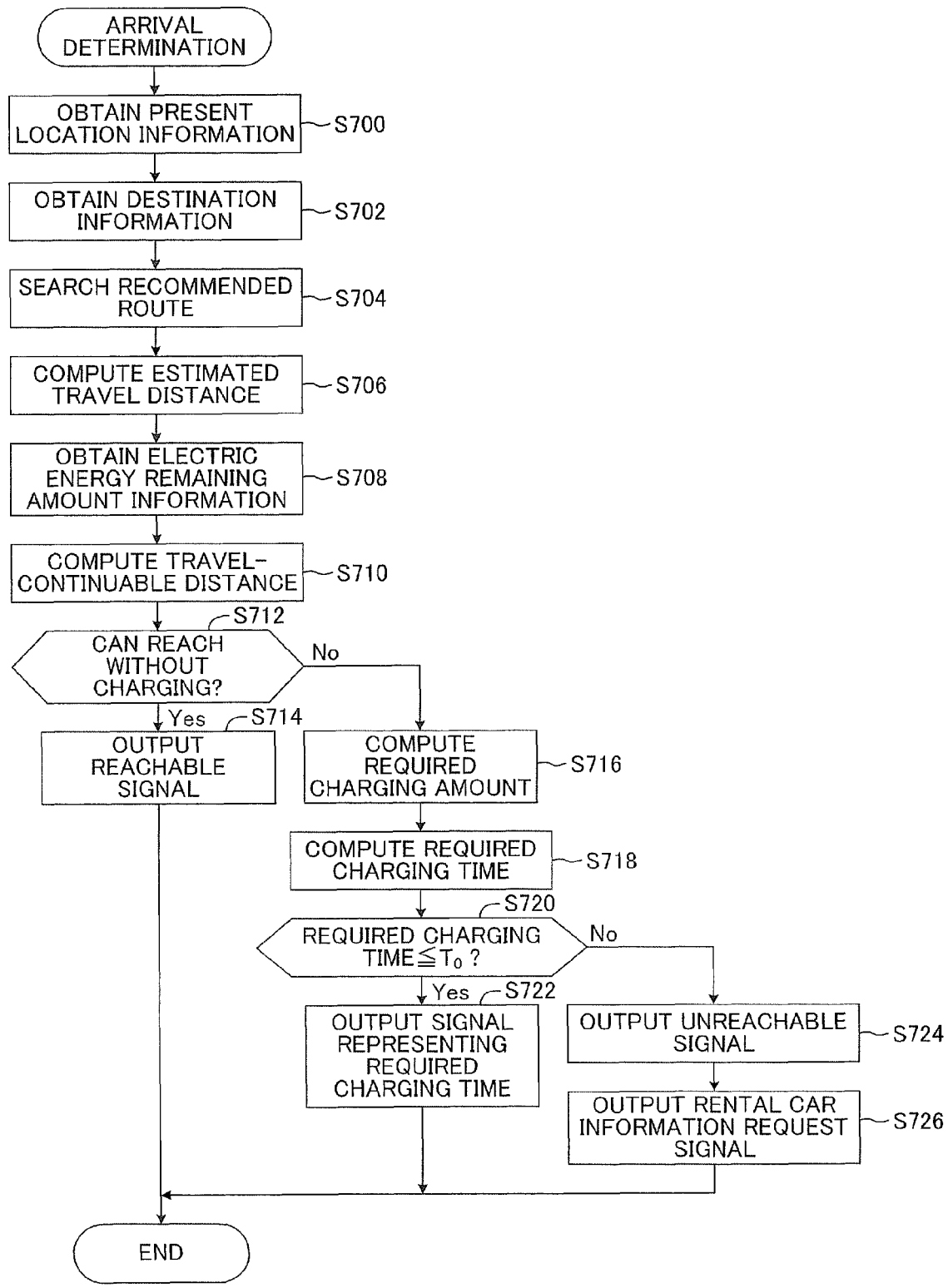
FIG. 12 is a flowchart showing arrival determination processing different from that shown in FIG. 5.

The arrival determination section 62 may execute arrival determination processing represented by a flowchart shown in FIG. 12, in place of the arrival determination processing shown in FIG. 5. This processing provides the rental car information when the charging time required for the vehicle V to reach the destination (required charging time) exceeds a set time.

The arrival determination processing shown in FIG. 12 is executed when the driver of the vehicle V presses the icon 211 for requesting information displayed on the display apparatus 20 shown in FIG. 4. When the icon 211 is pressed, the arrival determination section 62 obtains the present location information of the vehicle V (S700), and obtains the destination information (S702). Subsequently, the arrival determination section 62 searches a recommended route on the basis of the present location information, the destination information, and the map information stored in the storage section 67 (S704), and computes the estimated travel distance on the basis of the recommended route (S706).

Next, the arrival determination section 62 obtains the electric energy remaining amount information (S708), and computes the travel-continuable distance on the basis of the obtained electric energy remaining amount information (S710). Subsequently, the arrival determination section 62 determines, through comparison between the estimated travel distance and the travel-continuable distance, whether or not the vehicle V can reach the destination while satisfying the condition of not charging the electricity storage unit 10 (S712). In the case where the vehicle V can reach the destination without charging the electricity storage unit 10 (S712: Yes), the arrival determination section 62 outputs a reachable signal to the information provision section 68 (S714). As a result, a reachable message is displayed on the display apparatus 20.

Meanwhile, in the case where the vehicle V cannot reach the destination without charging the electricity storage unit 10 (S712: No), the arrival determination section 62 proceeds to S716, and computes a charging amount required for the vehicle V to reach the destination (required charging amount). The required charging amount is obtained by dividing the difference between the estimated travel distance and the travel-continuable distance by the electric energy consumption ratio.

Next, the arrival determination section 62 computes a charging time required for the vehicle V to reach the destination (required charging time) on the basis of the charging amount–charging time table stored in the storage section 67 (S718). Subsequently, the arrival determination section 62 determines whether or not the required charging time is equal to or less than a preset time $T_0$ (S720). The set time $T_0$ may be determined arbitrarily.

In the case where the required charging time is equal to or less than the set time $T_0$ (S720: Yes), the arrival determination section 62 proceeds to S722, and outputs a signal representing the required charging time to the information provision section 68. The information provision section 68 sends the received signal to the ECU 40. The ECU 40 displays the required charging time on the display apparatus 20 on the basis of the received signal. Thus, the driver of the vehicle V knows the charging time required for reaching the destination. Further, in the case where the required charging time is equal to or less than the set time $T_0$, the time loss for charging is small. Thus, if the driver of the vehicle V charges the electricity storage unit 10 in advance at the present location, the driver can reach the destination by using the vehicle V, without charging the electricity storage unit 10 on the way to the destination.

Meanwhile, in the case where the required charging time exceeds the set time $T_0$ (S720: No), the arrival determination section 62 proceeds to S724, and outputs an unreachable signal to the information provision section 68. As a result, an unreachable message is displayed on the display apparatus 20.

Next, the arrival determination section 62 outputs a rental car information request signal to the information provision section 68 (S726). The information provision section 68 sends the received rental car information request signal to the ECU 40. On the basis of the received rental car information request signal, the ECU 40 displays an icon for requesting the rental car information on the display apparatus 20, on which the unreachable message is displayed. When this icon is pressed, the rental car information acquisition section 63 of the main computer 60 executes the rental car information acquisition processing shown in FIG. 8. As a result, the rental car information is displayed on the display apparatus 20. The driver of the vehicle V determines whether to rent a rental car on the basis of the displayed information.

As described above, in the case where the arrival determination section 62 executes the arrival determination processing shown in FIG. 12, the arrival determination section 62 displays the unreachable message on the display 20 when charging of the electricity storage unit 10 is necessary for the vehicle V to reach the destination (S712: No) and the required charging time exceeds the set time $T_0$. That is, the arrival determination section 62 determines whether or not the vehicle V can reach the destination from the present location while satisfying the condition that the charging time of the electricity storage unit 10 required for the vehicle V to reach the destination from the present location is equal to or less than the set time $T_0$. When the required charging time is 0 (that is, the result of the determination in S712 is "Yes") or when the required charging time is greater than 0 but not greater than the set time $T_0$ ((that is, the result of the determination in S720 is "Yes"), the rental car information is not provided. In this case, the driver of the vehicle V does not charge the electricity storage unit 10 or charges the electricity storage unit 10 for a short period of time. Thus, the driver can reach the destination by use of the vehicle V, without renting a rental car. Further, the provision of the rental car information is prevented when the rental car information is unnecessary.

Meanwhile, in the case where the required charging time is greater than the set time $T_0$ (that is, the result of the determination in S720 is "No"), the arrival determination section 62 determines that the driver cannot reach the destination by using the vehicle V. In such a case, the rental car information is provided. The driver of the vehicle V can rent a car on the basis of the provided rental car information, and can reach the destination by using that rental car. Thus, a time loss produced as a result of charging the electricity storage unit 10 can be reduced.

Figure 13:
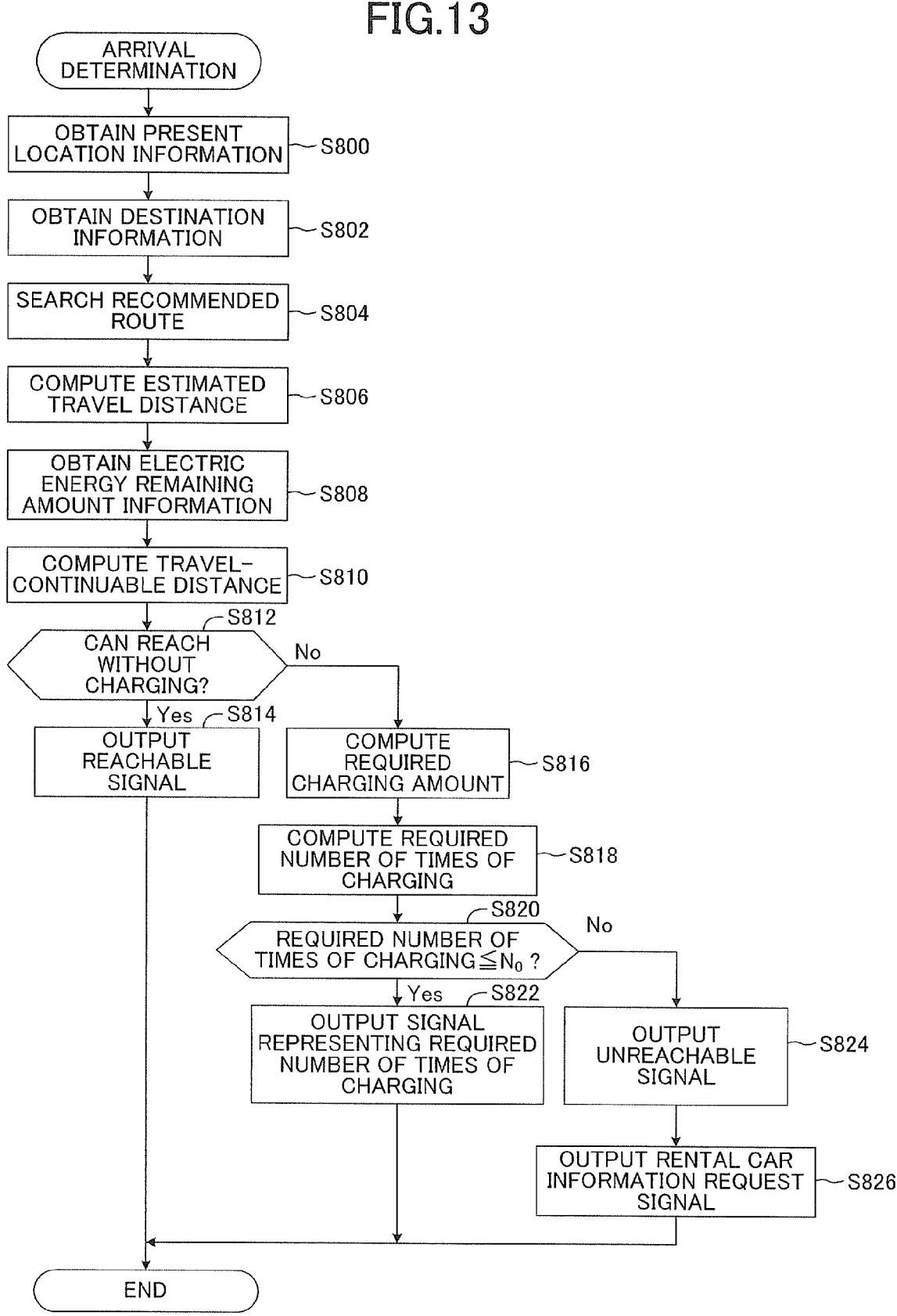
FIG. 13 is a flowchart showing arrival determination processing different from those shown in FIGS. 5 and 12.

The arrival determination section 62 may execute arrival determination processing represented by a flowchart shown in FIG. 13, in place of the arrival determination processing shown in FIG. 5 or FIG. 12. This processing provides the rental car information when the number of times of charging required for the vehicle V to reach the destination (the required number of times of charging) exceeds a set number of times.

The arrival determination processing shown in FIG. 13 is executed when the driver of the vehicle V presses the icon 211 for requesting information, which is displayed on the display apparatus 20 shown in FIG. 4. When the icon 211 is pressed, the arrival determination section 62 obtains the present location information of the vehicle V (S800), and obtains the destination information (S802). Subsequently, the arrival determination section 62 searches a recommended route on the basis of the present location information, the destination information, and the map information stored in the storage section 67 (S804), and computes the estimated travel distance on the basis of the recommended route (S806).

Next, the arrival determination section 62 obtains the electric energy remaining amount information (S808), and computes the travel-continuable distance on the basis of the obtained electric energy remaining amount information (S810). Subsequently, the arrival determination section 62 determines, through comparison between the estimated travel distance and the travel-continuable distance, whether or not the vehicle V can reach the destination without charging the electricity storage unit 10 (S812). In the case where the vehicle V can reach the destination without charging the electricity storage unit 10 (S812: Yes), the arrival determination section 62 outputs a reachable signal to the information provision section 68 (S814). As a result, a reachable message is displayed on the display apparatus 20.

Meanwhile, in the case where the vehicle V cannot reach the destination without charging the electricity storage unit 10 (S812: No), the arrival determination section 62 proceeds to S816, and computes a charging amount required for the vehicle V to reach the destination (required charging amount). Next, the arrival determination section 62 calculates the number of times of charging required for the vehicle V to reach the destination (the required number of times of charging) on the basis of the charging amount–charging time table stored in the storage section 67, and the storage capacity of the electricity storage unit 10 (S818). In the case where the required charging amount is equal to or less than a charging amount required for fully charging the electricity storage unit 10, the required number of times of charging is one. In the case where the required charging amount is greater than the charging amount required for fully charging the electricity storage unit 10, a value obtained as follows is used as the required number of times of charging. That is, the charging amount required for fully charging the electricity storage unit 10 is subtracted from the required charging amount so as to obtain a charging amount difference. The charging amount difference is divided by the storage capacity of the electricity storage unit 10. The resultant value is rounded up to the nearest whole number, and one is added to the resultant whole number, whereby the value used as the required number of times of charging is obtained.

Subsequently, the arrival determination section 62 determines whether or not the required number of times of charging is equal to or less than a previously set number of times $N_0$ (S820). The set number of times $N_0$ can be arbitrarily determined.

In the case where the required number of times of charging is equal to or less than the set number of times $N_0$ (S820: Yes), the arrival determination section 62 proceeds to S822, and outputs a signal representing the required number of times of charging to the information provision section 68. The information provision section 68 sends the received signal to the ECU 40. The ECU 40 displays the required number of times of charging on the display apparatus 20 on the basis of the received signal. Thus, the driver of the vehicle V knows the number of times of charging required for reaching the destination. Further, in the case where the required number of times of charging is equal to or less than the set number of times $N_0$, the time and labor for charging the electricity storage unit 10 are small. Therefore, the driver of the vehicle V can reach the destination by using the vehicle V, while charging the electricity storage unit 10 on the way to the destination without feeling the troublesomeness of the charging operation.

Meanwhile, in the case where the required number of times of charging is greater than the set number of times $N_0$ (S820: No), the arrival determination section 62 proceeds to S824, and outputs an unreachable signal to the information provision section 68. As a result, an unreachable message is displayed on the display apparatus 20.

Next, the arrival determination section 62 outputs a rental car information request signal to the information provision section 68 (S826). The information provision section 68 sends the received rental car information request signal to the ECU 40. On the basis of the received rental car information request signal, the ECU 40 displays an icon for requesting the rental car information on the display apparatus 20, on which the unreachable message is displayed. When this icon is pressed, the rental car information acquisition section 63 of the main computer 60 executes the rental car information acquisition processing shown in FIG. 8. As a result, the rental car information is displayed on the display apparatus 20. The driver of the vehicle V determines whether to rent a rental car on the basis of the displayed information.

As described above, in the case where the arrival determination section 62 executes the arrival determination processing shown in FIG. 13, the arrival determination section 62 displays the unreachable message on the display apparatus 20 when charging of the electricity storage unit 10 is necessary for the vehicle V to reach the destination (S812: No) and the required number of times of charging exceeds the set number of times $N_0$. That is, the arrival determination section 62 determines whether or not the vehicle V can reach the destination from the present location while satisfying the condition that the number of times of charging of the electricity storage unit 10 required for the vehicle V to reach the destination from the present location is equal to or less than the set number of times $N_0$. When the required number of times of charging is 0 (that is, the result of the determination in S812 is "Yes") and when the required number of times of charging is greater than 0 but not greater than the set number of times $N_0$ (that is, the result of the determination in S820 is "Yes"), the rental car information is not provided. In this case, by charging the electricity storage unit 10, the driver of the vehicle V can reach the destination without renting a rental car. Thus, the cost for renting a rental car can be eliminated. Further, the provision of the rental car information is prevented when the rental car information is unnecessary.

Meanwhile, in the case where the required number of times of charging is greater than the set number of times $N_0$ (that is, the result of the determination in S820 is "No"), the arrival determination section 62 determines that the driver cannot reach the destination by using the vehicle V. In such a case, the rental car information is provided. The driver of the vehicle V can rent a rental car on the basis of the provided rental car information, and can reach the destination by using that rental car. Thus, it becomes possible to eliminate the great time loss produced as a result of frequent charging of the electricity storage unit 10, and the labor for charging work.

Figure 14:
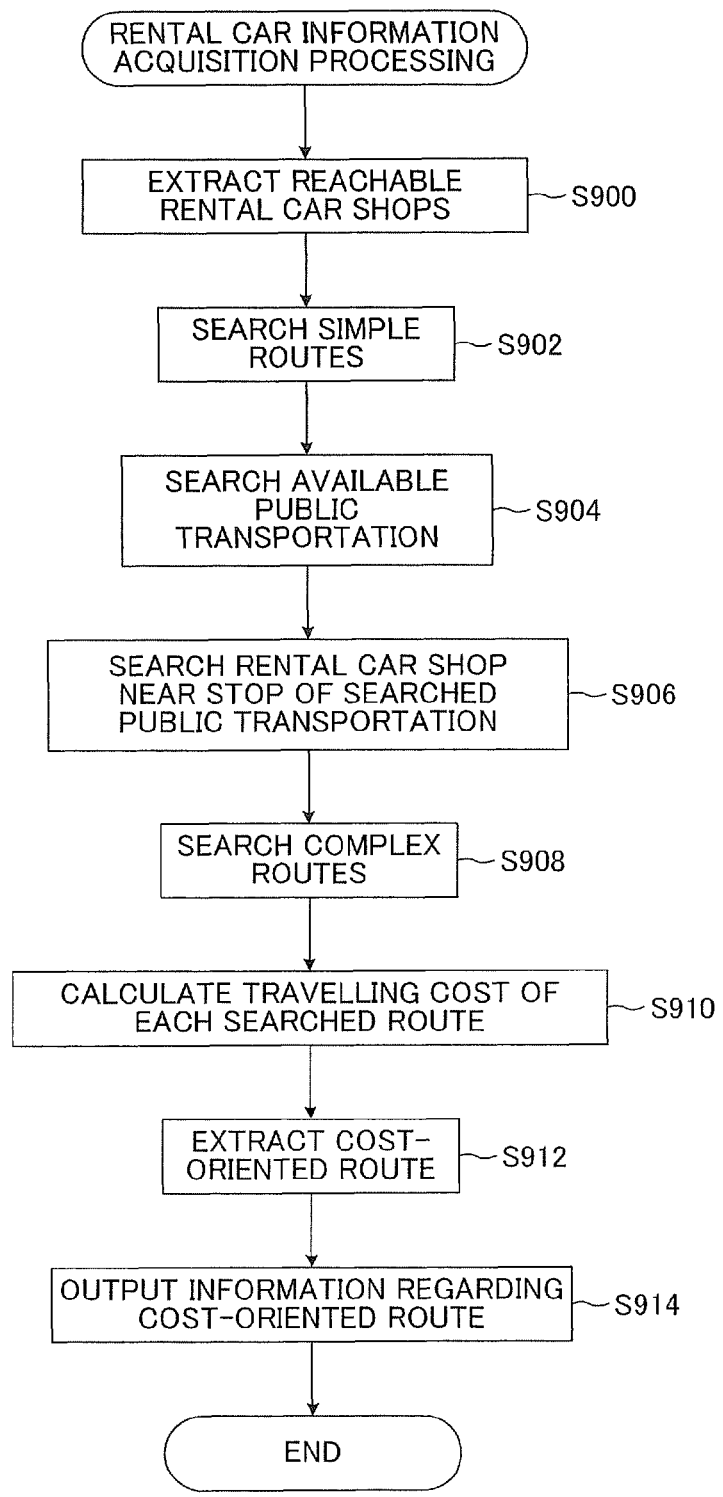
FIG. 14 is a flowchart showing rental car information acquisition processing different from those shown in FIGS. 8 and 10.

The rental car information acquisition section 63 may execute rental car information acquisition processing represented by a flowchart shown in FIG. 14, in place of the rental car information acquisition processing shown in FIG. 8 or FIG. 10. This processing provides information necessary for the driver of the vehicle V to reach the destination at the lowest cost by use of a rental car and other modes of transportation such as public transportation, when the vehicle V cannot reach the destination without charging the electricity storage unit 10.

The rental car information acquisition processing shown in FIG. 14 is executed when the driver of the vehicle V presses the icon 222 for requesting the rental car information displayed on the display apparatus 20 shown in FIG. 6. When the icon 222 is pressed, the rental car information acquisition section 63 first extracts a rental car shop which the vehicle V can reach without charging the electricity storage unit 10, on the basis of the rental car information stored in the storage section 67 (S900). Next, the rental car information acquisition section 63 searches a route (simple route) for reaching the destination via the extracted rental car shop (S902). In this case, a plurality of simple routes may be searched.

Next, the rental car information acquisition section 63 searches public transportations which can be used (available transportation). In this case, the rental car information acquisition section 63 searches a public transportation having a stop which the vehicle V can reach without charging the electricity storage unit 10 (S904). The public transportation may be a transportation used by a large number of the general public. For example, the public transportation may be a bus or train. Next, the rental car information acquisition section 63 searches a rental car shop near the stop of the searched public transportation (S906). For example, the rental car information acquisition section 63 searches a rental car shop which the driver can reach on foot from a stop of the public transportation without tiring; for example, a rental car shop within a 1 km area (circular area whose radius is 1 km) around the stop.

Next, the rental car information acquisition section 63 searches a route (complex route) for reaching the destination by making use of the searched public transportation and a rental car (S908). In this case, the rental car information acquisition section 63 searches a route in which the driver uses the searched public transportation and a rental car owned by the rental car shop near the stop of that public transportation. A plurality of complex routes may be searched.

Figure 15:
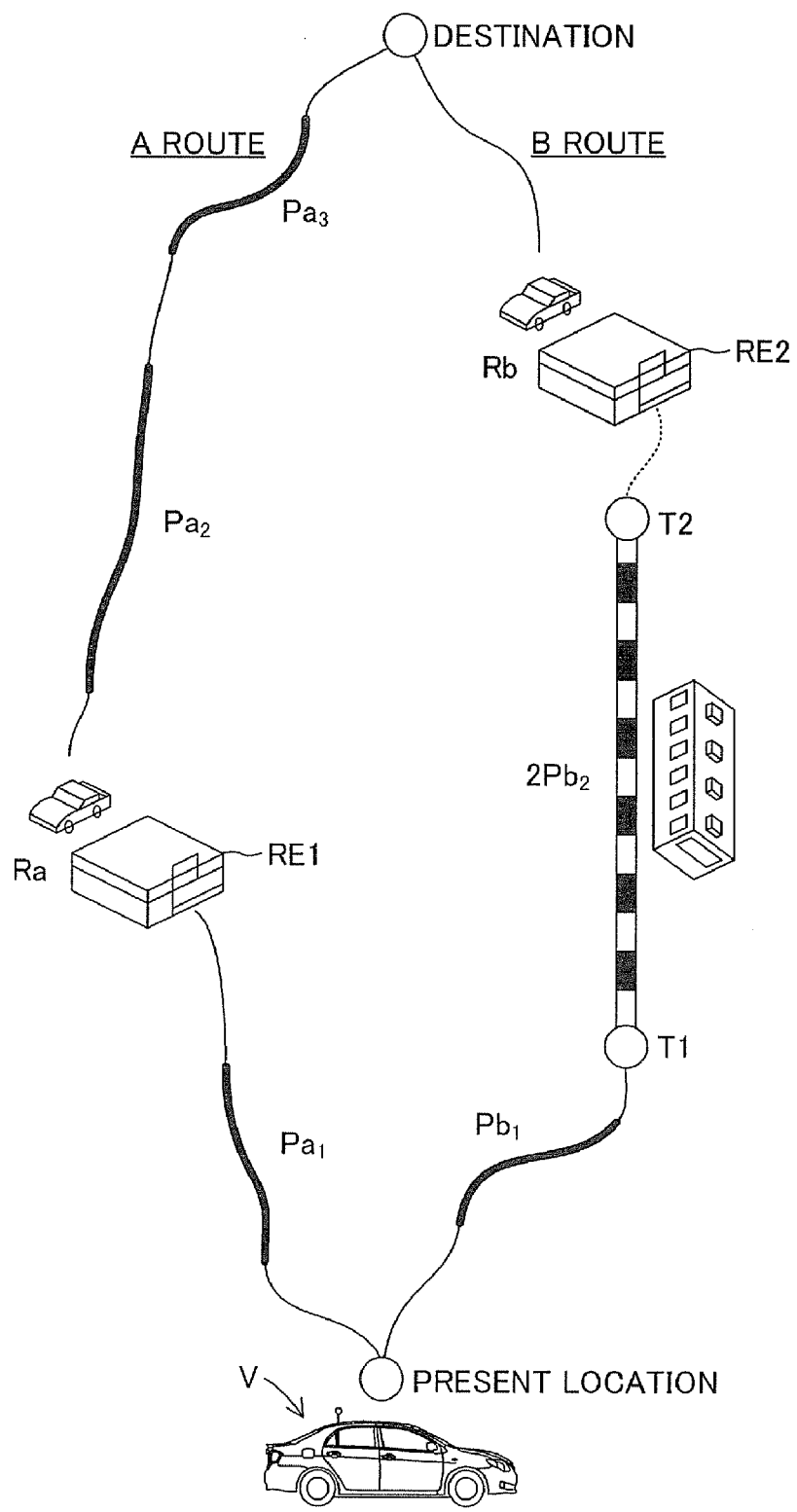
FIG. 15 is an illustration showing a simple route and a complex route searched by a rental car information acquisition section.

FIG. 15 shows a simple route (A route) and a complex route (B route) searched by the rental car information acquisition section 63. According to the A route, the driver of the vehicle V first travels to a rental car shop RE1 by use of the vehicle V. Then, the driver of the vehicle V rents a car at that rental car shop, and travels to the destination by use of the rental car. According to the B route, the driver of the vehicle V first travels to a train station T1 by use of the vehicle V. At the station T1, the driver takes a train, and moves to a station T2. The driver walks from the station T2 to a rental car shop RE2.

Then, the driver rents a car at the rental car shop RE2, and travels to the destination by use of the rental car. As described above, each of the A route and the B route is a route which extends from the present location to the destination and in which the driver uses a rental car in at least a portion of the route. The processing of the S902 and that of S908 correspond to the route search section of the present invention. Notably, the rental car shop RE2 is provided at a location which the vehicle V cannot reach from the present location without charging the electricity storage unit 10.

After that, the rental car information acquisition section 63 computes the cost of traveling to the destination for all the searched simple routes and complex routes (S910).

According to the A route shown in FIG. 15, the driver passes through one toll road by use of the vehicle V, and two toll roads by use of the rental car (these toll roads are shown by thick lines in the drawing). The tolls of these toll roads are $Pa_1, Pa_2, Pa_3$, respectively. Further, the cost of the rental car to be rented at the rental car shop RE1 is Ra. Accordingly, the cost of traveling to the destination along the A route is represented by $Pa_1+Pa_2+Pa_3+Ra$.

According to the B route shown in FIG. 15, the driver passes through one toll road by use of the vehicle V. The toll of this toll road is $Pb_1$. Further, a fare for using a train is necessary. In the case where the occupants of the vehicle V are two adults and the train fare per adult is $Pb_2$, the cost of using the train is $2Pb_2$. Furthermore, the cost of the rental car to be rented at the rental car shop RE2 is Rb. Accordingly, the cost of traveling to the destination along the B route is represented by $Pb_1+2Pb_2+Rb$. In this manner, the rental car information acquisition section 63 calculates the traveling cost for the simple route and the complex route. If the driver parks the vehicle V at a parking area near the train station T1, the parking cost may be included in the traveling cost. The processing of S910 corresponds to the cost information acquisition section of the present invention.

After that, the rental car information acquisition section 63 extracts, from the routes for which the traveling cost has been calculated, a route whose traveling cost is the lowest, as a cost-oriented route (S912). The processing of S912 corresponds to the route extraction section of the present invention.

Next, the rental car information acquisition section 63 outputs information regarding the extracted cost-oriented route to the information provision section 68. The information provision section 68 sends the received cost-oriented route information to the ECU 40. The ECU 40 displays the received cost-oriented route information on the display apparatus 20. The displayed information may include, for example, a traveling cost required to reach the destination by using the cost-oriented route, and display of the cost-oriented route on a map. The displayed information enables the driver of the vehicle V to know the cost required to reach the destination in advance. Further, the driver of the vehicle V can reach the destination at low cost in accordance with the displayed cost-oriented route.

When the information regarding the cost-oriented route is displayed on the display apparatus 20, an icon for requesting a route guide to a location to which the driver travels by use of the vehicle V (a rental car shop or a stop or station of a public transportation) may be displayed on the display apparatus 20. By pressing this icon, route guide by use of the vehicle V is performed.

As described above, in the case where the rental car information acquisition section 63 executes the rental car information acquisition processing shown in FIG. 14, the arrival determination section 62 acquires information regarding a cost-oriented route which requires the lowest cost to reach the destination. Then, the acquired cost-oriented route and the cost are provided to the driver of the vehicle V. Therefore, the driver of the vehicle V can know the cost necessary to reach the destination in advance. Further, the driver can reach the destination at low cost in accordance with the provided cost-oriented route.

Although the embodiments of the present invention have been described, the present invention should not be construed to be limited to the above-described embodiments. For example, in the above-described embodiments, the information provision apparatus is the main computer 60 provided in the central management center C. However, the information provision apparatus may be mounted on the vehicle V. For example, a navigation apparatus mounted on the vehicle V is configured to have function as the information provision apparatus of the present invention. Alternatively, a portable information terminal or the like may be configured to have function as the information provision apparatus of the present invention.

Further, according to the rental car information acquisition processing shown in FIG. 8, a rental car shop in a region which the driver can reach by use of the vehicle V is extracted. However, a rental car shop outside the region which the driver can reach by making use of the vehicle V may be extracted if the driver can reach the rental car shop by use of other modes of transportation. In this case, the driver of the vehicle V reaches the rental car shop via the other modes of transportation. Then, the driver changes from the vehicle V indirectly to the rental car, and travels toward the destination.

In the above-described embodiments, there is shown an example case where, when the driver cannot reach the destination by use of the vehicle V, the driver uses a rental car owned by a rental car shop. However, the driver may use a rental car owned by individual.

In the above-described embodiments, in the case where the information provision apparatus (the main computer 60) determines that the vehicle V cannot reach the destination, the information provision apparatus provides the rental car information in accordance with the driver's request; i.e., when the driver of the vehicle V presses the icon 222 (FIG. 6) for requesting the rental car information, which is displayed on the display apparatus 20. However, the information provision apparatus may be modified to automatically provide the rental car information when it determines that the vehicle V cannot reach the destination.

In the above-described embodiments, when the rental car information acquisition section 63 acquires the rental car information, the driver selects a desired vehicle model. However, the information provision apparatus may propose a recommended vehicle model which suits the driver' preferences. Alternatively, the information provision apparatus may present conditions for selecting a vehicle model, set priority order on the displayed selection conditions, and propose a recommended vehicle model on the basis of the priority order.

In the above-described embodiments, when the rental car information acquisition section 63 acquires the rental car information, the driver selects a desired vehicle model, and, if the selected vehicle model is not available, the driver selects another vehicle model. However, the rental car information acquisition section 63 may be configured to provide rental car information regarding available vehicle models or a recommended vehicle model to the driver, rather than requesting the driver to select another vehicle model.

According to the above-described embodiments, as shown in FIG. 14, the information provision apparatus provides information regarding a cost-oriented route. However, the information provision apparatus may provide information regarding a route selected in consideration of other needs. For example, the information provision apparatus may be configured such that, in the case where the occupants of the vehicle V travel to the destination while carrying a large piece of luggage, the information provision apparatus provides information regarding a route which reduces the load imposing on the traveling occupants, such as a route which does not utilize a public transportation, such a train or bus. In such a case, it is contemplated that the weight of the luggage is automatically detected by the vehicle V. Alternatively, the information provision apparatus may be configured such that, in the case where a pregnant woman, an elderly person, or a handicapped person is included in occupants of the vehicle V, the information provision apparatus provides information regarding a route which requires a small number of times of transfer. As described above, the present invention can be modified without departing from its scope.

What is claimed is:

1. An information provision apparatus for providing information for reaching a destination to a driver of a vehicle which includes a chargeable electricity storage unit and is driven by using electric energy supplied from the electricity storage unit, the information provision apparatus comprising:
   an arrival determination section which determines whether or not the vehicle can reach the destination from the present location in such a manner as to satisfy a predetermined condition, on the basis of present location information, which is information regarding a present location of the vehicle, destination information, which is information regarding the destination, and electric energy remaining amount information, which is information regarding a remaining amount of electric energy stored in the electricity storage unit;
   a rental car information acquisition section which acquires rental car information, which is information regarding a rental car to which the driver can change from the vehicle directly or indirectly; and
   an information provision section which provides the rental car information acquired by the rental car information acquisition section, when the arrival determination section determines that the vehicle cannot reach the destination from the present location.

2. An information provision apparatus according to claim 1, wherein the predetermined condition is a condition of not charging the electricity storage unit.

3. An information provision apparatus according to claim 1, wherein the predetermined condition is a condition that a charging time of the electricity storage unit required for the vehicle to reach the destination from the present location is equal to or less than a previously set time.

4. An information provision apparatus according to claim 1, wherein the predetermined condition is a condition that the number of times of charging required for the vehicle to reach the destination from the present location is equal to or less than a previously set number of times.

5. An information provision apparatus according to claim 1, wherein the rental car information acquisition section acquires information regarding a rental car which is present in a region which the vehicle can reach from the present position without charging the electricity storage unit.

6. An information provision apparatus according to claim 5, wherein, in the case where a rental car is not present in a region which the vehicle can reach from the present position without charging the electricity storage unit, the rental car information acquisition section acquires information regarding a vehicle dispatch service which dispatches a rental car to a location within the region, and the information provision section provides the information regarding the vehicle dispatch service acquired by the rental car information acquisition section, when the arrival determination section determines that the vehicle cannot reach the destination from the present location.

7. An information provision apparatus according to claim 1, wherein the rental car information acquisition section includes:
   a route searching section which searches a plurality of routes each of which extends from the present location to the destination and in each of which a rental car is used in at least a portion of the route, when the arrival determination section determines that the vehicle cannot reach the destination from the present location;
   a cost information acquisition section which acquires information regarding a cost required for reaching the destination in accordance with each of the plurality of routes searched by the route searching section; and
   a route extraction section which extracts a cost-oriented route, which is a route that is the lowest in cost, on the basis of the cost information acquired by the cost information acquisition section, wherein
   the information provision section provides information regarding a cost required for reaching the destination in accordance with the cost-oriented route, when the arrival determination section determines that the vehicle cannot reach the destination from the present location.

8. An information provision apparatus according claim 1, wherein the rental car information acquisition section preferentially acquire information regarding a rental car which suits the preferences of the driver of the vehicle.

9. An information provision apparatus according to claim 2, wherein the rental car information acquisition section acquires information regarding a rental car which is present in a region which the vehicle can reach from the present position without charging the electricity storage unit.

10. An information provision apparatus according to claim 3, wherein the rental car information acquisition section acquires information regarding a rental car which is present in a region which the vehicle can reach from the present position without charging the electricity storage unit.

11. An information provision apparatus according to claim 4, wherein the rental car information acquisition section acquires information regarding a rental car which is present in a region which the vehicle can reach from the present position without charging the electricity storage unit.

12. An information provision apparatus according to claim 9, wherein, in the case where a rental car is not present in a region which the vehicle can reach from the present position without charging the electricity storage unit, the rental car information acquisition section acquires information regarding a vehicle dispatch service which dispatches a rental car to a location within the region, and the information provision section provides the information regarding the vehicle dispatch service acquired by the rental car information acquisition section, when the arrival determination section determines that the vehicle cannot reach the destination from the present location.

13. An information provision apparatus according to claim 10, wherein, in the case where a rental car is not present in a region which the vehicle can reach from the present position without charging the electricity storage unit, the rental car information acquisition section acquires information regarding a vehicle dispatch service which dispatches a rental car to a location within the region, and the information provision section provides the information regarding the vehicle dispatch service acquired by the rental car information acquisition section, when the arrival determination section determines that the vehicle cannot reach the destination from the present location.

14. An information provision apparatus according to claim 11, wherein, in the case where a rental car is not present in a region which the vehicle can reach from the present position without charging the electricity storage unit, the rental car information acquisition section acquires information regarding a vehicle dispatch service which dispatches a rental car to a location within the region, and the information provision section provides the information regarding the vehicle dispatch service acquired by the rental car information acquisition section, when the arrival determination section determines that the vehicle cannot reach the destination from the present location.

* * * * *